United States Patent
Seo et al.

(10) Patent No.: US 8,009,606 B2
(45) Date of Patent: Aug. 30, 2011

(54) METHOD AND APPARATUS FOR INDICATING DEACTIVATION OF SEMI-PERSISTENT SCHEDULING

(75) Inventors: Dong Youn Seo, Anyang-Si (KR); Ki Jun Kim, Anyang-Si (KR); Dae Won Lee, Anyang-Si (KR); Young Woo Yun, Anyang-Si (KR); Joon Kui Ahn, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/581,584

(22) Filed: Oct. 19, 2009

(65) Prior Publication Data

US 2010/0118807 A1    May 13, 2010

Related U.S. Application Data

(60) Provisional application No. 61/114,440, filed on Nov. 13, 2008, provisional application No. 61/119,375, filed on Dec. 3, 2008.

(30) Foreign Application Priority Data

Jul. 24, 2009   (KR) .................. 10-2009-0067796

(51) Int. Cl.
*H04B 7/204* (2006.01)
(52) U.S. Cl. ....................................... 370/319
(58) Field of Classification Search .............. None
See application file for complete search history.

(56) References Cited

U.S. PATENT DOCUMENTS

| 2008/0090583 A1 | 4/2008 | Wang et al. |
| 2008/0117891 A1 | 5/2008 | Damnjanovic et al. |
| 2008/0130590 A1 | 6/2008 | Kim et al. |
| 2008/0232284 A1 | 9/2008 | Dalsgaard et al. |
| 2009/0257408 A1* | 10/2009 | Zhang et al. ............ 370/336 |
| 2010/0111026 A1* | 5/2010 | Hsu ........................ 370/329 |

FOREIGN PATENT DOCUMENTS

| KR | 10-2008-0032825 | 4/2008 |
| KR | 10-2008-0032825 A | 4/2008 |

OTHER PUBLICATIONS

"3rd Generation Partnership Project; Technical Specification Group Radio Access Network; Evolved Universal Terrestrial Radio Access (E-UTRA); Radio Resource Control (RCC); Protocol Specification (Release 8)", 3GPP Organizational Partners, 3GPP TS 36.331 V8.4.0, Dec. 2008.

* cited by examiner

*Primary Examiner* — Raj K Jain
(74) *Attorney, Agent, or Firm* — Birch, Stewart, Kolasch & Birch, LLP

(57) ABSTRACT

A method and apparatus for performing semi-persistent scheduling (SPS) deactivation in a wireless mobile communication system are disclosed. A base station (BS) transmits a downlink control channel to a user equipment (UE), and deactivates the SPS when a binary field indicating resource allocation information contained in the downlink control channel is entirely filled with '1'.

24 Claims, 20 Drawing Sheets

FIG. 16

| S\L | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 | 16 | 17 | 18 | 19 |
| 2 | 20 | 21 | 22 | 23 | 24 | 25 | 26 | 27 | 28 | 29 | 30 | 31 | 32 | 33 | 34 | 35 | 36 | 37 | 38 | 39 |
| 3 | 40 | 41 | 42 | 43 | 44 | 45 | 46 | 47 | 48 | 49 | 50 | 51 | 52 | 53 | 54 | 55 | 56 | 57 | 58 | 59 |
| 4 | 60 | 61 | 62 | 63 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 | 96 | 97 | 98 | 99 |
| 6 | 100 | 101 | 102 | 103 | 104 | 105 | 106 | 107 | 108 | 109 | 110 | 111 | 112 | 113 | 114 | 115 | 116 | 117 | 118 | 119 |
| 7 | 120 | 121 | 122 | 123 | 124 | 125 | 126 | 127 | 128 | 129 | 130 | 131 | 132 | 133 | 134 | 135 | 136 | 137 | 138 | 139 |
| 8 | 140 | 141 | 142 | 143 | 144 | 145 | 146 | 147 | 148 | 149 | 150 | 151 | 152 | 153 | 154 | 155 | 156 | 157 | 158 | 159 |
| 9 | 160 | 161 | 162 | 163 | 164 | 165 | 166 | 167 | 168 | 169 | 170 | 171 | 172 | 173 | 174 | 175 | 176 | 177 | 178 | 179 |
| 10 | 180 | 181 | 182 | 183 | 184 | 185 | 186 | 187 | 188 | 189 | 190 | 191 | 192 | 193 | 194 | 195 | 196 | 197 | 198 | 199 |
| 11 | 200 | 201 | 202 | 203 | 204 | 205 | 206 | 207 | 208 | 209 | 210 | 211 | 212 | 213 | 214 | 215 | 216 | 217 | 218 | 219 |
| 12 | 199 | 198 | 197 | 196 | 195 | 194 | 193 | 192 | 191 | 190 | 189 | 188 | 187 | 186 | 185 | 184 | 183 | 182 | 181 | 180 |
| 13 | 179 | 178 | 177 | 176 | 175 | 174 | 173 | 172 | 171 | 170 | 169 | 168 | 167 | 166 | 165 | 164 | 163 | 162 | 161 | 160 |
| 14 | 159 | 158 | 157 | 156 | 155 | 154 | 153 | 152 | 151 | 150 | 149 | 148 | 147 | 146 | 145 | 144 | 143 | 142 | 141 | 140 |
| 15 | 139 | 138 | 137 | 136 | 135 | 134 | 133 | 132 | 131 | 130 | 129 | 128 | 127 | 126 | 125 | 124 | 123 | 122 | 121 | 120 |
| 16 | 119 | 118 | 117 | 116 | 115 | 114 | 113 | 112 | 111 | 110 | 109 | 108 | 107 | 106 | 105 | 104 | 103 | 102 | 101 | 100 |
| 17 | 99 | 98 | 97 | 96 | 95 | 94 | 93 | 92 | 91 | 90 | 89 | 88 | 87 | 86 | 85 | 84 | 83 | 82 | 81 | 80 |
| 18 | 79 | 78 | 77 | 76 | 75 | 74 | 73 | 72 | 71 | 70 | 69 | 68 | 67 | 66 | 65 | 64 | 63 | 62 | 61 | 60 |
| 19 | 59 | 58 | 57 | 56 | 55 | 54 | 53 | 52 | 51 | 50 | 49 | 48 | 47 | 46 | 45 | 44 | 43 | 42 | 41 | 40 |
| 20 | 39 | 38 | 37 | 36 | 35 | 34 | 33 | 32 | 31 | 30 | 29 | 28 | 27 | 26 | 25 | 24 | 23 | 22 | 21 | 20 |

METHOD AND APPARATUS FOR INDICATING DEACTIVATION OF SEMI-PERSISTENT SCHEDULING

This application claims the benefit of Korean Patent Application No. 10-2009-0067796, filed on Jul. 24, 2009, which is hereby incorporated by reference as if fully set forth herein.

This application also claims the benefit of U.S. Provisional Application Ser. Nos. 61/114,440, filed on Nov. 13, 2008 and 61/119,375, filed on Dec. 3, 2008 the contents of which are hereby incorporated by reference herein in their entirety.

BACKGROUND OF THE INVENTION

1. Field of the Invention

The present invention relates to a wireless communication system, and more particularly, to a method for scheduling radio resources for semi-persistent uplink/downlink packet data transmission in a cellular wireless communication system, a structure of scheduling information, a scheme for transmitting the scheduling information, and an apparatus using the above-mentioned method and scheme as well as the scheduling information structure.

2. Discussion of the Related Art

A 3$^{rd}$ Generation Partnership Project Long Term Evolution (3GPP LTE) communication system (hereinafter referred to as an "LTE system" for convenience of description) will hereinafter be described as an example of a mobile communication system applicable to the present invention.

A frame structure for use in the LTE system will hereinafter be described. The 3GPP LTE system supports a type 1 radio frame structure applicable to frequency division duplex (FDD), and a type 2 radio frame structure applicable to time division duplex (TDD).

FIG. 1 shows a structure of a type 1 radio frame used in the LTE system. The type 1 radio frame includes 10 subframes, each of which consists of two slots. A time length of each constituent unit is shown in FIG. 1.

FIG. 2 shows a structure of a type 2 radio frame used in the LTE system. The type 2 radio frame includes two half-frames, each of which is composed of five subframes, a downlink piloting time slot (DwPTS), a guard period (GP), and an uplink piloting time slot (UpPTS), in which one subframe consists of two slots. That is, one subframe is composed of two slots irrespective of the radio frame type. A time length of each constituent unit is shown in FIG. 2.

A resource grid structure for use in the LTE system will hereinafter be described in detail.

FIG. 3 shows an uplink (UL) time-frequency resource grid structure for use in the 3GPP LTE system.

Referring to FIG. 3, an uplink signal transmitted from each slot can be described by a resource grid including $N_{RB}^{UL} N_{SC}^{RB}$ subcarriers and $N_{symb}^{UL}$ Single Carrier-Frequency Division Multiple Access (SC-FDMA) symbols. Here, $N_{RB}^{UL}$ represents the number of resource blocks (RBs) in an uplink, $N_{SC}^{RB}$ represents the number of subcarriers constituting one RB, and $N_{symb}^{UL}$ represents the number of SC-FDMA symbols in one uplink slot. $N_{RB}^{UL}$ varies with an uplink transmission bandwidth constructed in a cell, and must satisfy $N_{RB}^{min,UL} \leq N_{RB}^{UL} \leq N_{RB}^{max,UL}$. Here, $N_{RB}^{min,UL}$ is the smallest uplink bandwidth supported by the wireless communication system, and $N_{RB}^{max,UL}$ is the largest uplink bandwidth supported by the wireless communication system. Although $N_{RB}^{min,UL}$ may be set to 6 ($N_{RB}^{min,UL}=6$) and $N_{RB}^{max,UL}$ may be set to 110 ($N_{RB}^{max,UL}=110$), the scopes of $N_{RB}^{min,UL}$ and $N_{RB}^{max,UL}$ are not limited thereto. The number of SC-FDMA symbols contained in one slot may be differently defined according to the length of a Cyclic Prefix (CP) and the spacing between subcarriers.

Each element contained in the resource grid is called a resource element (RE), and can be identified by an index pair (k,l) contained in a slot, where k is an index in a frequency domain and is set to any one of $0, \ldots, N_{RB}^{UL} N_{SC}^{RB} - 1$, and l is an index in a time domain and is set to any one of $0, \ldots, N_{symb}^{UL} - 1$.

A Physical Resource Block (PRB) is defined by $N_{symb}^{UL}$ consecutive SC-FDMA symbols in a time domain and $N_{SC}^{RB}$ consecutive subcarriers in a frequency domain. $N_{symb}^{UL}$ and $N_{SC}^{RB}$ may be predetermined values, respectively. Therefore, one PRB in an uplink may be composed of $N_{symb}^{UL} \times N_{SC}^{RB}$ resource elements. In addition, one PRB may correspond to one slot in a time domain and 180 kHz in a frequency domain. A PRB number $n_{PRB}$ and a resource element index (k,l) in a slot can satisfy a predetermined relationship denoted by $$n_{PRB} = \left\lfloor \frac{k}{N_{SC}^{RB}} \right\rfloor.$$

FIG. 4 shows a downlink (DL) time-frequency resource grid structure for use in the LTE system.

Referring to FIG. 4, a downlink signal transmitted from each slot can be described by a resource grid including $N_{RB}^{DL} N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. $N_{RB}^{DL}$ varies with an uplink transmission bandwidth constructed in a cell, and must satisfy $N_{RB}^{min,DL} \leq N_{RB}^{DL} \leq N_{RB}^{max,DL}$. Here, $N_{RB}^{min,DL}$ is the smallest uplink bandwidth supported by the wireless communication system, and $N_{RB}^{max,DL}$ is the largest uplink bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max,DL}=110$), the scopes of $N_{RB}^{min,DL}$ and $N_{RB}^{max,DL}$ are not limited thereto. The number of OFDM symbols contained in one slot may be differently defined according to the length of a Cyclic Prefix (CP) and the subcarrier spacing. When transmitting data or information via multiple antennas, one resource grid for each antenna port may be defined.

Each element contained in the resource grid is called a resource element (RE), and can be identified by an index pair (k,l) contained in a slot, where k is an index in a frequency domain and is set to any one of $0, \ldots, N_{RB}^{DL} N_{SC}^{RB} - 1$, and l is an index in a time domain and is set to any one of $0, \ldots, N_{symb}^{DL} - 1$.

Resource blocks (RBs) shown in FIGS. 3 and 4 are used to describe a mapping relationship between certain physical channels and resource elements (REs). The RBs can be classified into physical resource blocks (PRBs) and virtual resource blocks (VRBs). Although the above mapping relationship between the VRBs and the PRBs has been disclosed on a downlink basis, the same mapping relationship may also be applied to an uplink.

One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. Therefore, one PRB may be composed of $N_{symb}^{DL} \times N_{SC}^{RB}$ resource elements. One PRB may correspond to one slot in a time domain and may also correspond to 180 kHz in a frequency domain, but it should be noted that the scope of the present invention is not limited thereto.

The PRBs are assigned numbers from 0 to $N_{RB}^{DL}-1$ in the frequency domain. A PRB number $n_{PRB}$ and a resource element index (k,l) in a slot can satisfy a predetermined relationship denoted by $$n_{PRB} = \left\lfloor \frac{k}{N_{sc}^{RB}} \right\rfloor.$$

The VRB may have the same size as that of the PRB. Two types of VRBs are defined, the first one being a localized VRB (LVRB) and the second one being a distributed type (DVRB). For each VRB type, a pair of VRBs in two slots of one subframe may assigned a single VRB number $n_{VRB}$.

The VRB may have the same size as that of the PRB. Two types of VRBs are defined, the first one being a localized VRB (LVRB) and the second one being a distributed VRB (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

In the LTE system based on an Orthogonal Frequency Division Multiple Access (OFDMA) scheme, a resource area in which each UE is able to transmit or receive data to and from a base station (BS) is allocated from the BS to the UE. In this case, not only a time resource but also a frequency resource must be simultaneously allocated to the UE so as to complete resource allocation.

The so-called non-persistent scheduling method can simultaneously indicate time-frequency resource domains allocated to the UE. Therefore, if there is a need for the UE to use resources for a long period of time, it must repeatedly perform signaling for resource allocation, so that signaling overhead may be considerably generated.

In contrast, the so-called semi-persistent scheduling method first allocates a time resource to a UE. In this case, the semi-persistent scheduling method may allow the time resource allocated to a specific UE to have periodicity. Then, the semi-persistent scheduling method allocates a frequency resource to the UE when necessary to complete time-frequency resource allocation. The above-mentioned frequency resource allocation may be referred to as 'activation'. When using the semi-persistent scheduling method, resource allocation can be maintained for a predetermined period by only one signaling process, so that resources need not be repeatedly allocated, resulting in reduction in signaling overhead. Thereafter, if the necessity of performing resource allocation for a UE disappears, a base station can transmit a signaling message for releasing the frequency resource allocation to the UE. In this way, the above-mentioned release of the frequency resource domain may be referred to as 'deactivation'. In this case, it is preferable that the signaling overhead needed for the deactivation be reduced.

SUMMARY OF THE INVENTION

An object of the present invention devised to solve the problem lies in a method and apparatus for informing a UE of SPS deactivation without adding a new bit field or a new control channel format in a communication system for allocating resources using a compact scheme.

The object of the present invention can be achieved by providing a method for releasing resource allocation in a wireless mobile communication system, the method including receiving, by a user equipment (UE), a downlink control channel including resource allocation information, and releasing resource allocation for the UE when a binary field indicating the resource allocation information is entirely filled with '1'.

In another aspect of the present invention, there is provided a method for transmitting a signal for releasing resource allocation in a wireless mobile communication system, the method including fills, by a base station (BS), a binary field indicating resource allocation information contained in a downlink control channel with '1', and transmitting the downlink control channel to a user equipment (UE), wherein the binary field entirely filled with the value of '1' indicates a release of resources allocated to the UE.

In another aspect of the present invention, there is provided a method for deactivating semi-persistent scheduling (SPS) in a wireless mobile communication system including receiving, by a user equipment (UE), a downlink control channel, and deactivating the semi-persistent scheduling (SPS) when a binary field indicating resource allocation information contained in the downlink control channel is entirely filled with '1'.

In another aspect of the present invention, there is provided a method for transmitting a signal for semi-persistent scheduling (SPS) deactivation in a wireless mobile communication system, the method including filling, by a base station (BS), a binary field indicating resource allocation information contained in a downlink control channel with '1', and transmitting the downlink control channel, wherein the binary field entirely filled with the value of '1' indicates the SPS deactivation.

In another aspect of the present invention, there is provided an apparatus capable of using a semi-persistent scheduling (SPS). The apparatus includes a radio frequency (RF) unit, and a processor electrically connected to the RF unit, wherein the processor is configured to receive a downlink control channel through the RF unit, and to perform the SPS deactivation when a binary field indicating resource allocation information contained in the downlink control channel is entirely filled with '1'.

In another aspect of the present invention, there is provided an apparatus capable of using a semi-persistent scheduling (SPS). The apparatus includes a radio frequency (RF) unit, and a processor electrically connected to the RF unit. The processor is configured to fill the entirety of a binary field indicating resource allocation information contained in a downlink control channel with '1' during the SPS deactivation, and to transmit the downlink control channel with the RF unit. The binary field entirely filled with '1' indicates the SPS deactivation.

In another aspect of the present invention, there is provided a user equipment (UE) for a wireless mobile communication system, the user equipment (UE) including a radio frequency (RF) unit, and a processor electrically connected to the RF unit, wherein the processor is configured to receive a downlink control channel including resource allocation information through the RF unit, and to release resource allocation for the UE when a binary field indicating the resource allocation information is entirely filled with '1'.

In another aspect of the present invention, there is provided a wireless communication apparatus including a radio frequency (RF) unit, and a processor electrically connected to the RF unit, wherein the processor is configured to fill the entirety of a binary field indicating resource allocation information contained in a downlink control channel with '1', and to transmit the downlink control channel to a user equipment (UE), the binary field being entirely filled with the value of '1' indicates a release of resources allocated to the UE.

The downlink control channel may be a physical downlink control channel (PDCCH).

A downlink control information (DCI) format of the downlink control channel may be a 'format 0' or a 'format 1A'.

The wireless mobile communication system may use a scheduling based on a compact scheme, and the binary field may be composed of a field indicating a resource indication value (RIV).

The wireless mobile communication system may use a scheduling based on a compact scheme, and the binary field may be composed of a field indicating a resource indication value (RIV) and a field indicating 'Gap' information used for distributed allocation of resources.

The wireless mobile communication system may use a scheduling based on a compact scheme, and the binary field may be composed of a field indicating a resource indication value (RIV) and a field indicating hopping information.

The resource allocation information may be composed of resource block allocation information, or may be composed of resource block allocation information and hopping resource allocation information.

The resource block allocation information may be represented by the RIV. The RIV may indicate a pair of a start index (S) and a length (L) of consecutive VRBs capable of being combined with each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 16 is a view illustrating an example of RIVs when the number of available RBs is 20 according to one embodiment of the present invention.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following description will be given centering upon a mobile communication system serving as an LTE system, but the present invention is not limited thereto and the remaining parts of the present invention other than unique characteristics of the LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may include mobile or fixed user equipments (UEs), for example, a user equipment (UE), a mobile station (MS) and the like, and may also be referred to in any of these ways as necessary. Also, the base station (BS) may be any of nodes included in a network communicating with the UE, for example, a Node B (Node-B) and an eNode B (eNode-B), and may also be referred to in any of these ways.

In a mobile communication system, a UE can receive information from a base station (BS) via a downlink, and the UE can also transmit information via an uplink. Information transferred from—or received by—the UE may be data, other control information, and the like, and there are a variety of physical channels according to types and usages of this information transferred or received from or in the UE.

Figure 1:
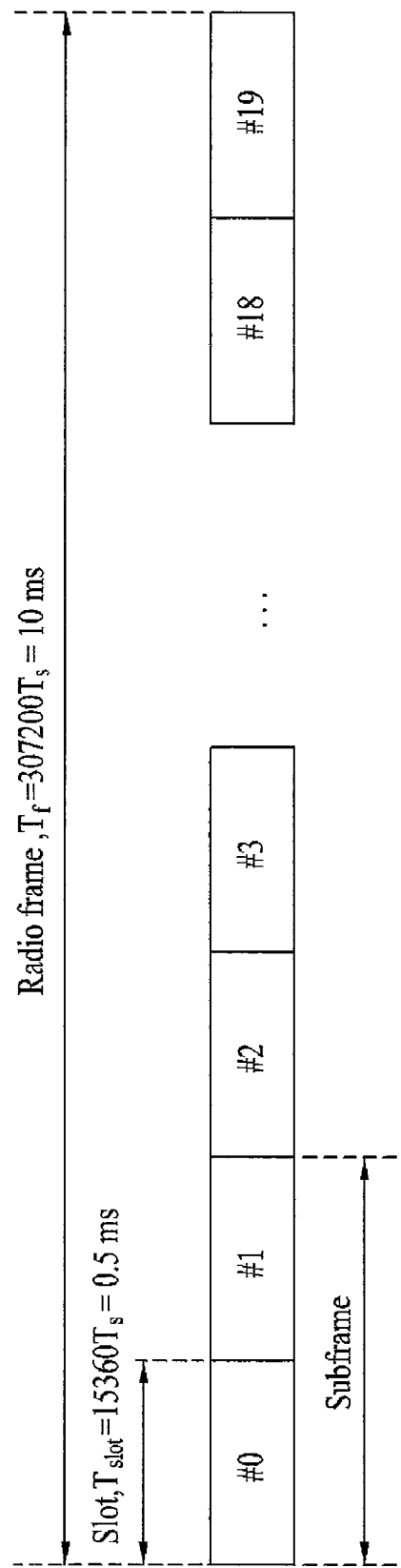
FIG. 1 shows a structure of a frequency division duplex (FDD) type radio frame used in an LTE system.
Figure 2:
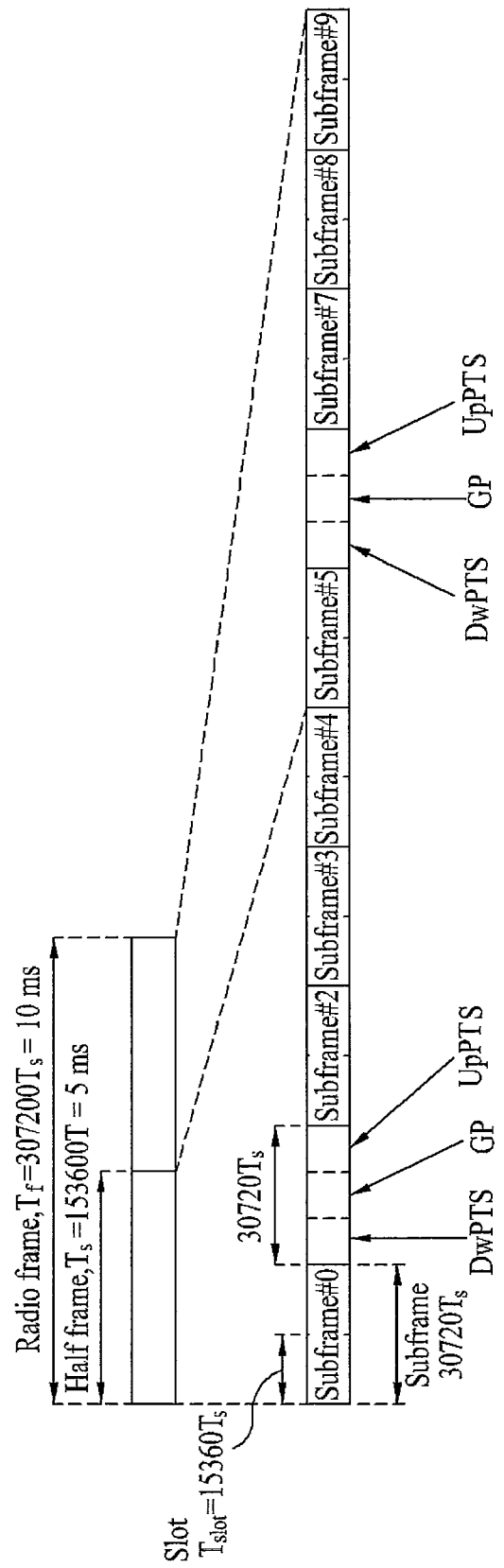
FIG. 2 shows a structure of a time division duplex (TDD) type radio frame used in an LTE system.
Figure 3:
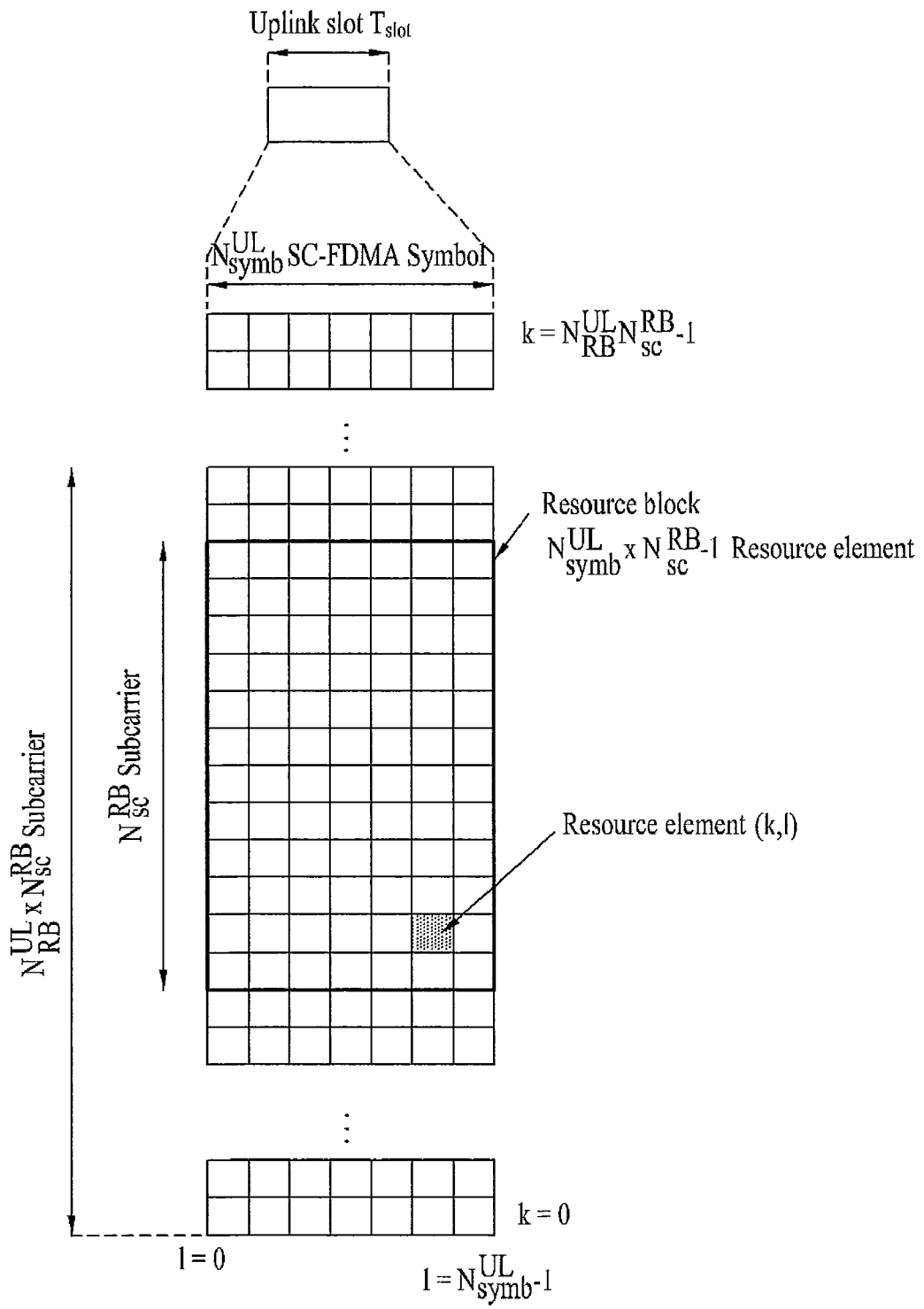
FIG. 3 shows an uplink (UL) resource grid structure for use in an LTE system.
Figure 4:
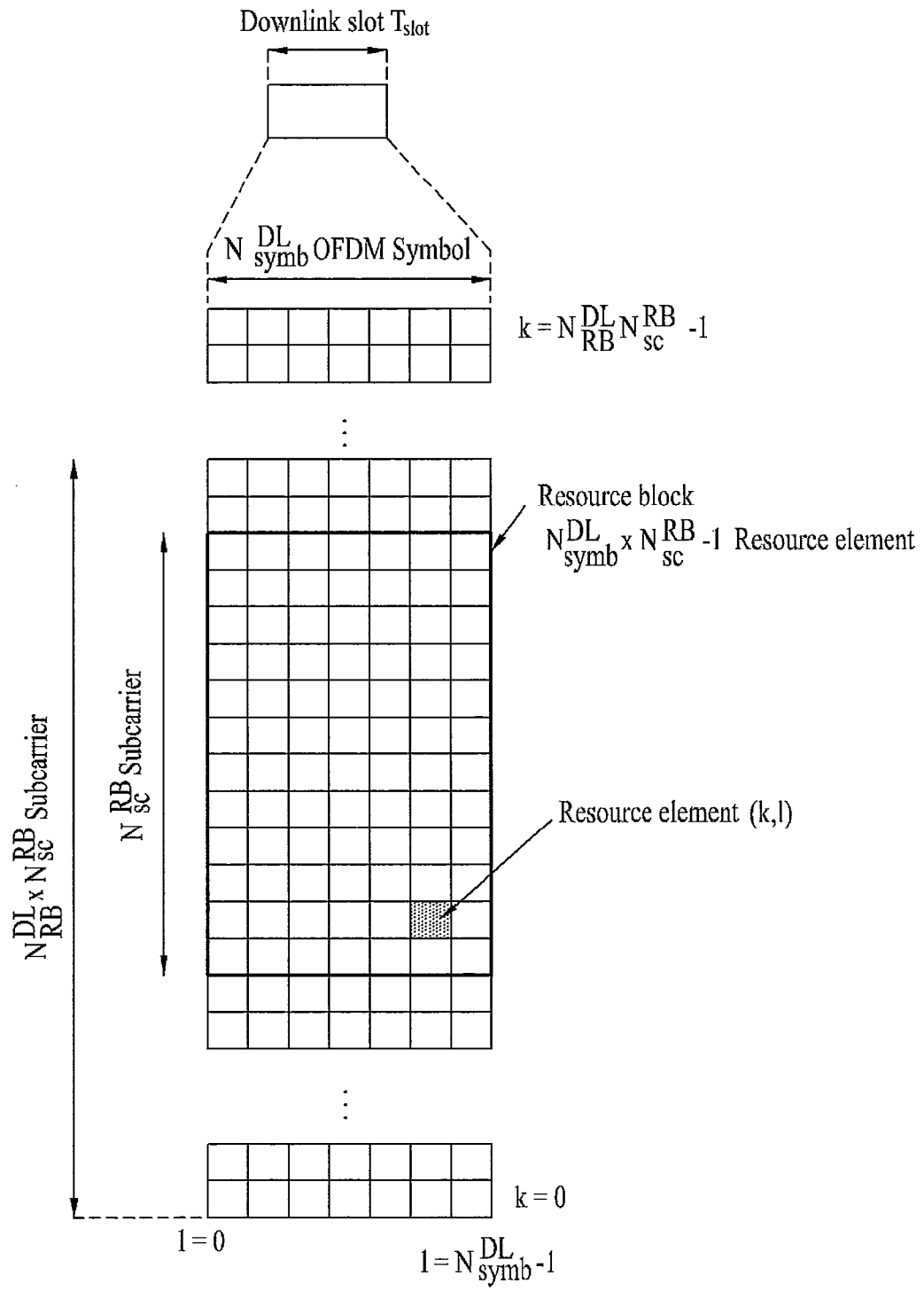
FIG. 4 shows a downlink (DL) resource grid structure for use in an LTE system.
Figure 5:
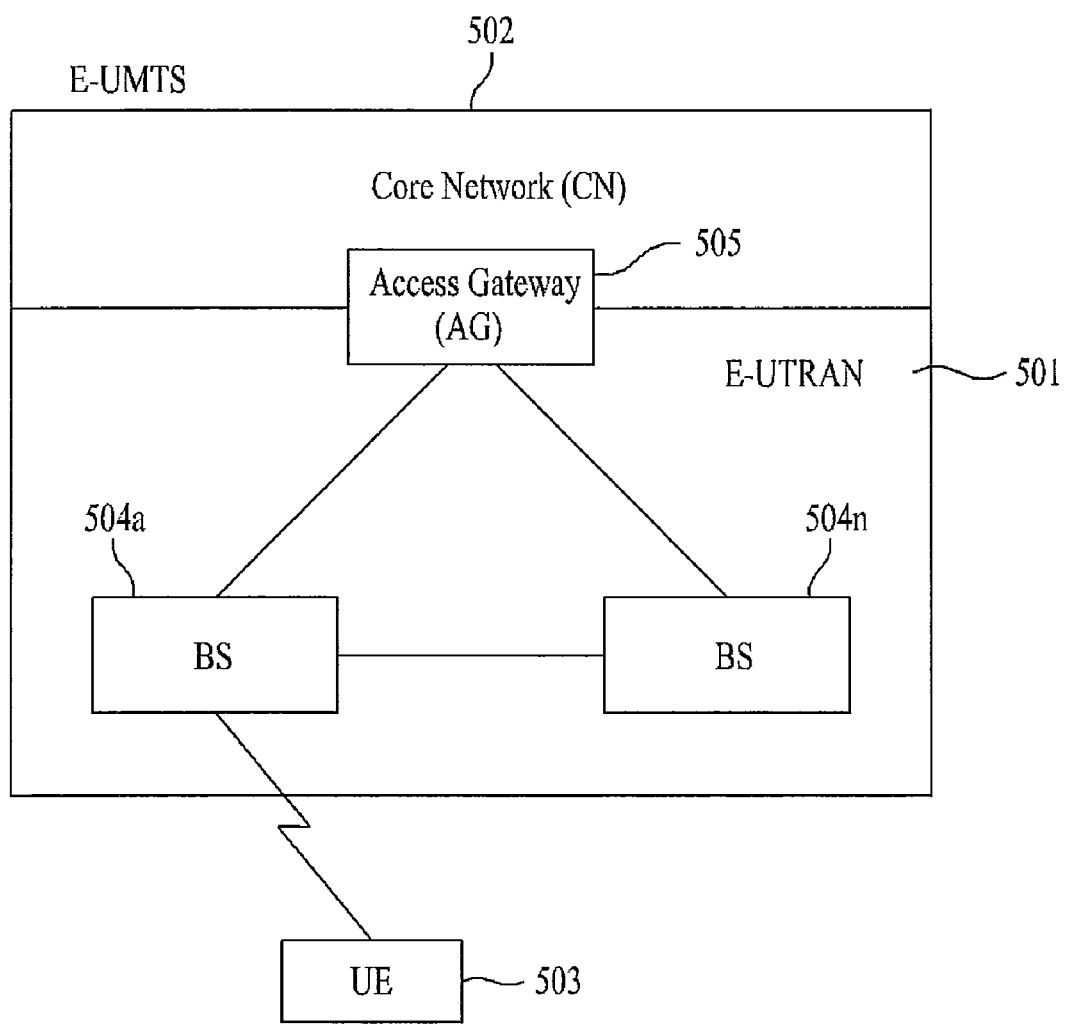
FIG. 5 is a block diagram illustrating an Evolved Universal Mobile Telecommunications System (E-UMTS) network structure as an example of a mobile communication system.

FIG. 5 shows an Evolved Universal Mobile Telecommunications System (E-UMTS) network structure serving as an example of a mobile communication system.

The E-UMTS system is an evolved version of the conventional Universal Mobile Telecommunications System (UMTS) system and basic standardization thereof is in progress under the 3rd Generation Partnership Project (3GPP). Generally, the E-UMTS is also referred to as a Long Term Evolution (LTE) system.

The E-UMTS network may be classified into an Evolved-UMTS Terrestrial Radio Access Network (E-UTRAN) 501 and a Core Network (CN) 502. The E-UTRAN includes a UE 503, a BS (eNB or eNode B) 504, and an Access Gateway (AG) 505 which is located at an end of a network and is connected to an external network. The AG 505 can be divided into a part that handles processing of user traffic and a part that handles control traffic. Here, the AG part 505 for processing new user traffic and the AG part for processing control traffic can communicate with each other using a new interface.

One or more cells may exist for one eNB. An interface for transmitting user traffic or control traffic can be used between eNBs. A Core Network (CN) 502 may include the AG 505 and a node or the like for user registration of the UE 503. An interface for discriminating between the E-UTRAN 501 and the CN 502 may be used.

Radio interface protocol layers between the UE and the network can be classified into an L1 layer (first layer), an L2 layer (second layer) and an L3 layer (third layer) on the basis of the lower three layers of the Open System Interconnection (OSI) reference model widely known in communication systems. A physical layer belonging to the L1 layer provides an information transfer service utilizing a physical channel. A Radio Resource Control (RRC) layer located at the L3 layer controls radio resources between the UE and the network. For this operation, RRC messages are exchanged between the UE and the network via the RRC layers. The RRC layers may be distributed among base stations (BSs) 504 and network nodes, or may be located only at a base station (BSs) 504 or the AG 505.

Figure 6:
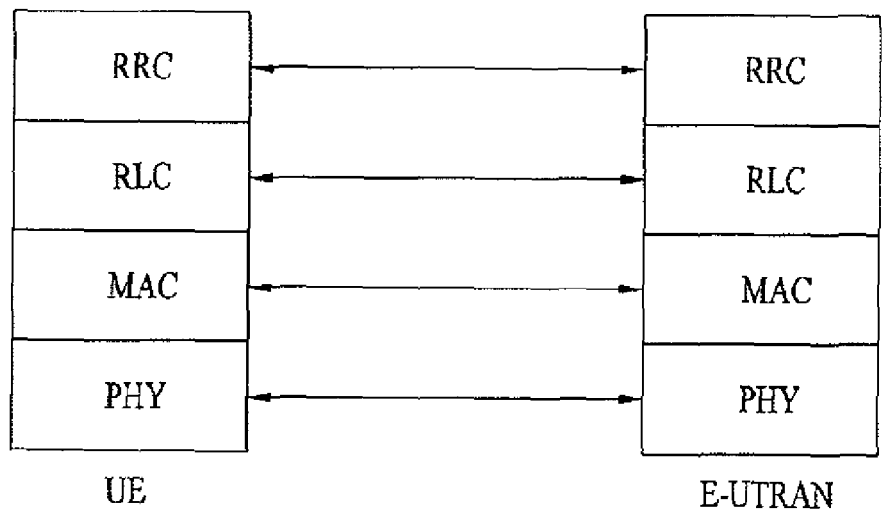
FIGS. 6 and 7 illustrate radio interface protocol structures between a UE and a UMTS Terrestrial Radio Access Network (UTRAN) that are based on a 3GPP LTE radio access network standard.
Figure 7:
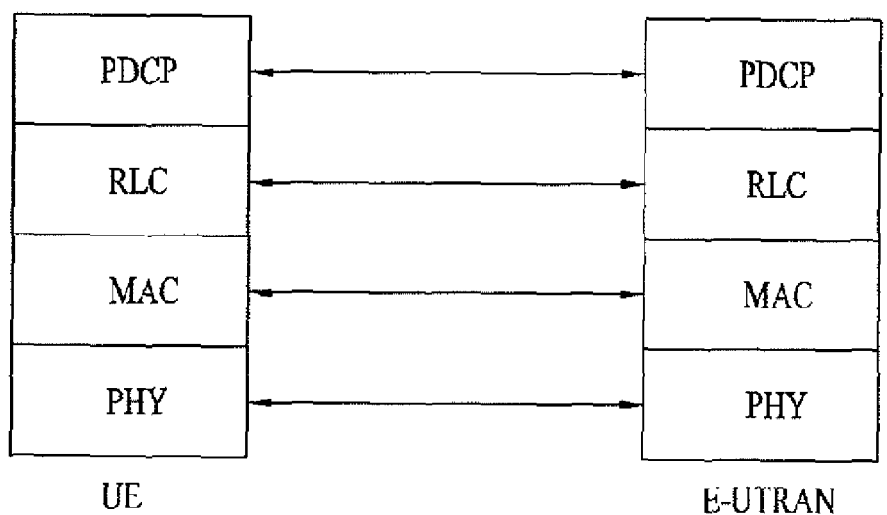

FIGS. 6 and 7 illustrate radio interface protocol structures between a UE and a UTRAN that are based on a 3GPP LTE radio access network standard.

The radio interface protocol of FIG. 6 or FIG. 7 is divided horizontally into a physical layer, a data link layer and a network layer, and vertically into a user plane for transmitting data information and a control plane for transmitting a control signal such as a signaling message. In more detail, FIG. 6 shows individual layers of a radio protocol control plane and FIG. 7 shows individual layers of a radio protocol user plane. Protocol layers of FIGS. 6 and 7 can be classified into an L1 layer (first layer), an L2 layer (second layer) and an L3 layer (third layer) on the basis of the lower three layers of the OSI reference model widely known in communication systems.

The following is a detailed description of respective layers of the radio protocol control plane of FIG. 6 and the radio protocol user plane of FIG. 7.

The physical layer, which is the first layer, provides an information transfer service to an upper layer using a physical channel. The physical layer (PHY) is connected to a Medium Access Control (MAC) layer, located above the physical layer, through a transport channel. Data is transferred between the MAC layer and the physical layer through the transport channel. In this case, the transport channel is classified into a dedicated transport channel and a common transport channel according to whether or not a channel is shared. Data transfer between different physical layers, specifically between the respective physical layers of a transmitter and a receiver, is performed through the physical channel.

A variety of layers exist in the second layer (L2 layer). The MAC layer maps various logical channels to various transport channels, and performs logical-channel multiplexing for mapping various logical channels to one transport channel. The MAC layer is connected to the RLC layer serving as an upper layer through a logical channel. The logical channel can be classified into a control channel for transmitting information of a control plane and a traffic channel for transmitting information of a user plane according to categories of transmission information.

The RLC layer of the second layer performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets such as IPv4 or IPv6 packets in a radio interval with a narrow bandwidth. As a result, only information required for a header part of data can be transmitted, so that transmission efficiency of the radio interval can be increased. In addition, in the LTE system, the PDCP layer performs a security function, this security function is composed of a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as HARQ ACK or NACK Scheduling Request (SR) and Channel Quality Indicator (CQI) report information, received from first and second layers (L1 and L2).

Figure 8:
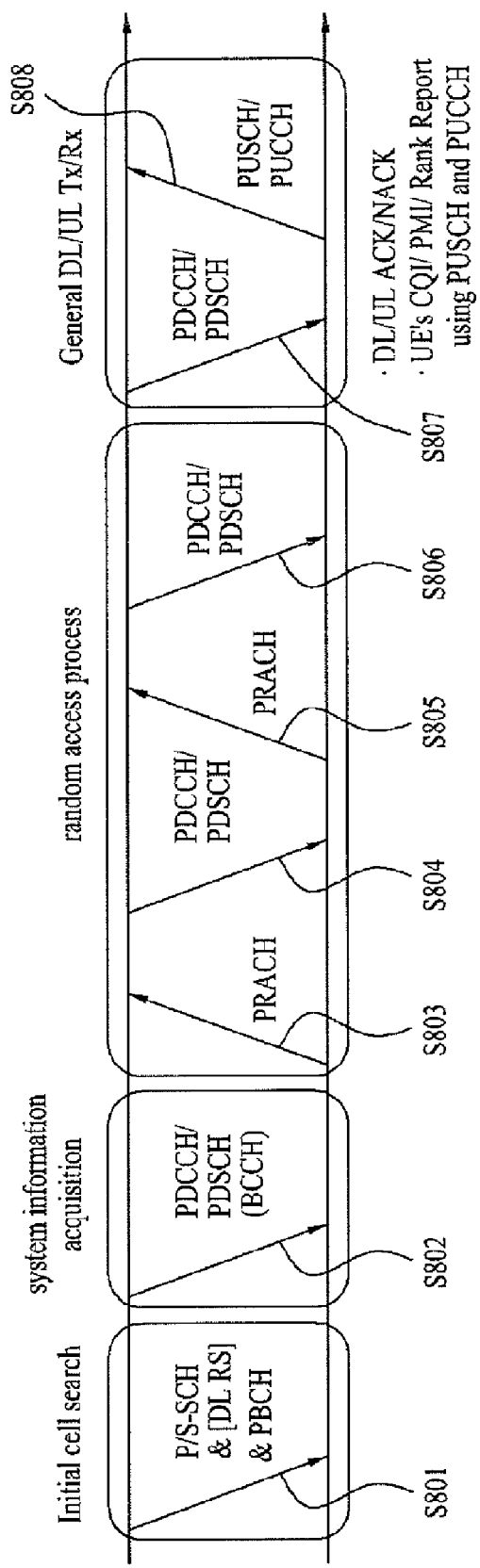
FIG. 8 shows physical channels used for an LTE system and a general signal transmission method capable of using the physical channels.

FIG. 8 shows physical channels used for a 3GPP LTE system serving as an example of a mobile communication system and a general signal transmission method capable of using the physical channels.

If a UE is re-powered on after being powered off or newly enters a cell region, the UE performs an initial cell search process, such as synchronization with a base station (BS), at step S801. For the initial cell search process, the UE receives information of a Primary Synchronization Channel (P-SCH) and information of a Secondary Synchronization Channel (S-SCH) from the base station (BS), is synchronized with the BS, and is able to acquire information such as a cell ID or the like from the BS. After that, the UE receives information of a physical broadcast channel from the BS, such that it can acquire inter-cell broadcast information from the BS. In the meantime, the UE receives a downlink reference signal (DL RS) at the initial cell searching step, so that it can recognize a downlink channel status.

After performing the initial cell search process, the UE receives information of a Physical Downlink Control Channel (PDCCH) and information of a Physical Downlink Shared Control Channel (PDSCH) based on the PDCCH information, so that it can acquire more detailed system information at step S802.

In the meantime, if a UE initially accesses the BS or has no resources for uplink transmission, the UE can perform a Random Access Procedure (RAP), such as steps S803 to S806, for the BS. For this operation, the UE transmits a specific sequence as a preamble through a Physical Random Access Channel (PRACH) at step S803, and receives a response message to the random access through a PDCCH and a PDSCH at step S804. In case of a competitive-based random access except for a handover case, a contention resolution procedure such as step S805 or S806 can then be carried out. At step S805, information is transmitted through an additional PRACH. At step S806, PDCCH/PDSCH information is received.

After performing the above-mentioned steps, as a procedure for transmitting UL/DL signals, the UE receives information of a PDCCH and a PDSCH at step S807, and transmits information through a Physical Uplink Shared Channel (PUSCH) and a Physical Uplink Control Channel (PUCCH) at step S808.

In the LTE system, a signaling process for transmitting UL/DL signals is as follows.

Figure 9:
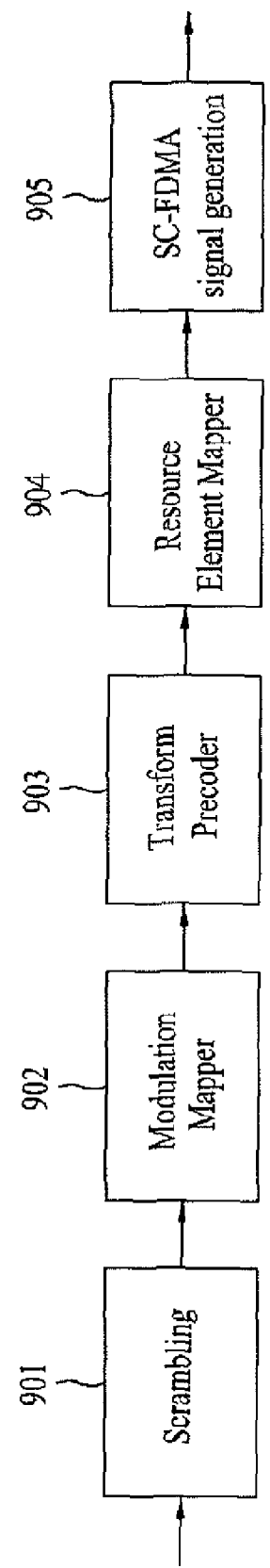
FIG. 9 is a conceptual diagram illustrating signal processing for enabling a UE to transmit an uplink signal.

FIG. 9 is a conceptual diagram illustrating signal processing for enabling a UE to transmit an uplink (UL) signal.

In order to transmit a UL signal, a scrambling module 901 of the UE can scramble a transmission signal using a specific scrambling signal of the UE. The scrambled signal is input to a modulation mapper 902, and is converted into a complex symbol using a BPSK (Binary Phase Shift Keying)—, QPSK (Quadrature Phase Shift Keying)—, or 16 QAM (Quadrature Amplitude Modulation)—scheme according to categories of the transmission signal and/or a channel status. After that, the modulated complex symbol is processed by a transform precoder 903, and is then input to the resource element mapper 904. The resource element mapper 904 is able to map a complex symbol to a time-frequency element to be used for actual transmission. The processed signal may be transmitted to the base station (BS) via the SC-FDMA signal generator 905.

Figure 10:
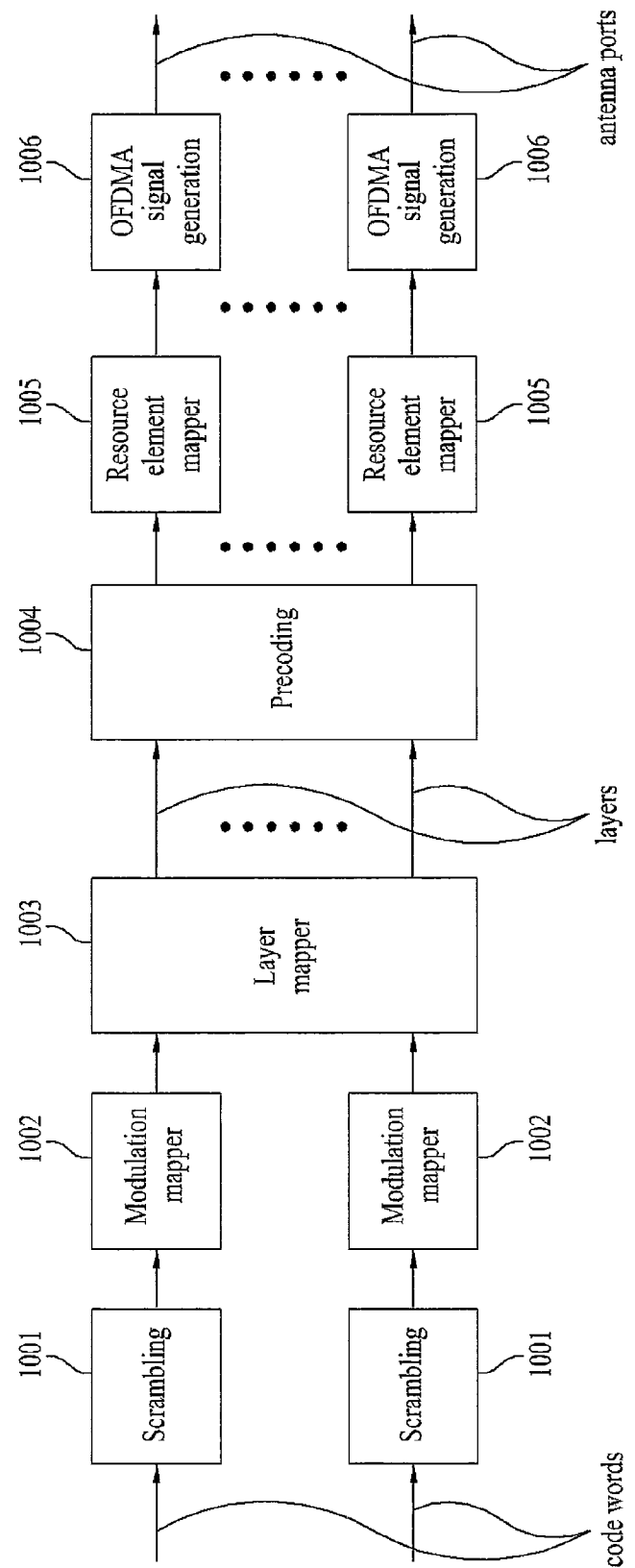
FIG. 10 is a conceptual diagram illustrating signal processing for enabling a base station (BS) to transmit a downlink signal.

FIG. 10 is a conceptual diagram illustrating signal processing for enabling the base station (BS) to transmit a downlink signal.

In the LTE system, the BS is able to transmit one or more codewords via a downlink. Therefore, one or more codewords may be processed as complex symbols by the scrambling module 1001 and the modulation mapper 1002 in the same manner as in the uplink case of FIG. 10. Thereafter, the complex symbols are mapped to a plurality of layers by the layer mapper 1003, and each layer may be multiplied by a predetermined precoding matrix selected depending on a channel status and may then be allocated to each transmission antenna by the precoding module 1004. The processed transmission signal for each antenna is mapped to a time-frequency resource element to be used for transmission by the resource element mapper 1005. After that, the mapped result can be transmitted via each antenna after passing through the Orthogonal Frequency Division Multiple Access (OFDMA) signal generator 1006.

In the case where a UE for use in a mobile communication system transmits an uplink signal, a Peak to Average Power Ratio (PAPR) may become more serious than in the case where the BS transmits a downlink signal. Thus, as described in FIGS. 9 and 10, the SC-FDMA scheme is used for uplink signal transmission in a different way from the OFDMA scheme used for downlink signal transmission.

In the LTE system, the SC-FDMA scheme for uplink signal transmission and the OFDMA scheme for downlink signal transmission will hereinafter be described in detail.

Figure 11:
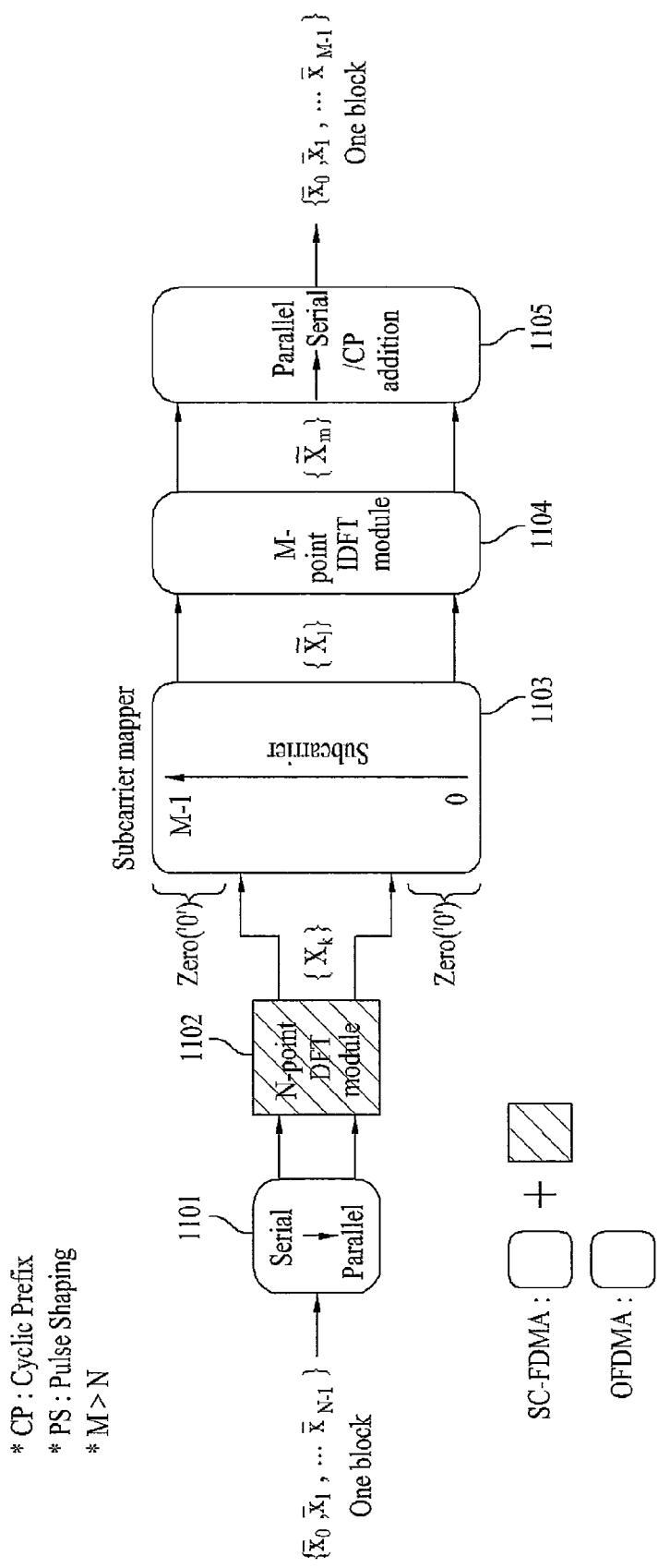
FIG. 11 is a conceptual diagram illustrating an SC-FDMA scheme for transmitting an uplink signal and an OFDMA scheme for transmitting a downlink signal in a mobile communication system.

FIG. 11 is a conceptual diagram illustrating the SC-FDMA scheme for uplink signal transmission and the OFDMA scheme for downlink signal transmission in a mobile communication system.

Referring to FIG. 11, not only a UE for transmitting an uplink signal but also a base station (BS) for transmitting a downlink signal includes a Serial-to-Parallel converter 1101, a subcarrier mapper 1103, an M-point IDFT module 1104, a Parallel-to-Serial converter 1105, and the like. However, a UE for transmitting a signal using the SC-FDMA scheme further includes an N-point DFT module 1102, and compensates for a predetermined part of the IDFT processing influence of the M-point IDFT module 1104 so that a transmission signal can have single carrier characteristics.

In a cellular orthogonal frequency division multiplex (OFDM) wireless packet communication system, uplink/downlink (UL/DL) data packet transmission is made on a subframe basis and one subframe is defined by a certain time interval including a plurality of OFDM symbols. Hereinafter, terms used in the detailed description of this application are defined as follows.

A 'resource element (RE)' represents a smallest frequency-time unit in which data or a modulated symbol of a control channel is mapped. Provided that a signal is transmitted in one OFDM symbol over M subcarriers and N OFDM symbols are transmitted in one subframe, M×N REs are present in one subframe.

A 'physical resource block (PRB)' represents a unit frequency-time resource for data transmission. In general, one PRB includes a plurality of consecutive REs in a frequency-time domain, and a plurality of PRBs is defined in one subframe.

A 'virtual resource block (VRB)' represents a virtual unit resource for data transmission. In general, the number of REs included in one VRB is equal to the length of REs included in one PRB, and, when data is transmitted, one VRB can be mapped to one PRB or some areas of a plurality of PRBs.

A 'localized virtual resource block (LVRB)' is one type of the VRB. One LVRB is mapped to one PRB. LVRBs having different logical indexes are mapped to PRBs having different physical indexes. An LVRB may be interpreted in the same as a PRB.

A 'distributed virtual resource block (DVRB)' is another type of VRB. One DVRB is mapped to some REs in a plurality of PRBs, and REs to which different DVRBs are mapped are not duplicated.

Figure 12:
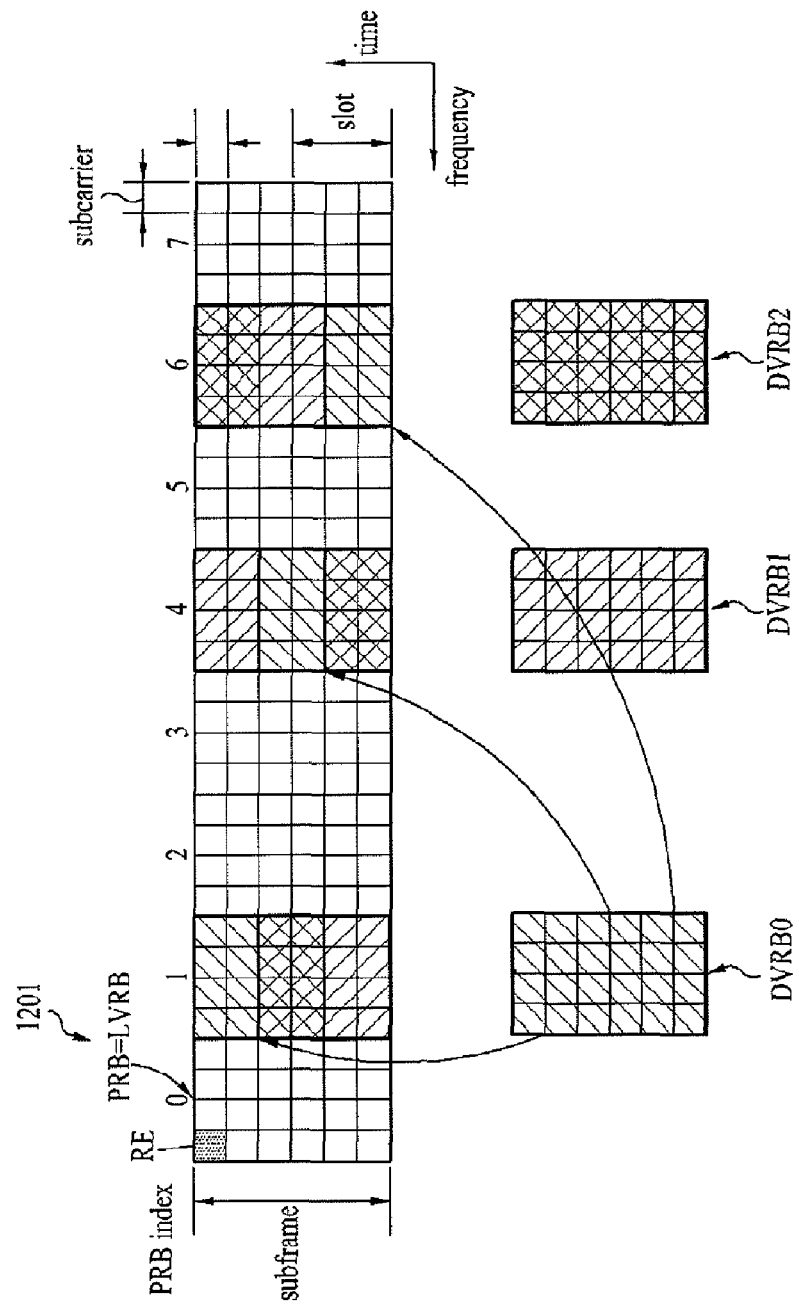
FIG. 12 is a view illustrating an example of a method for mapping distributed virtual resource blocks (DVRBs) and localized virtual resource blocks (LVRBs) to physical resource blocks (PRBs).

'$N_D$'='$N_d$' represents the number of PRBs to which one DVRB is mapped. FIG. 12 illustrates an example of a method for mapping DVRBs and LVRBs to PRBs. In FIG. 12, $N_D$=3. As can be seen from FIG. 12, an arbitrary DVRB can be divided into three parts and the divided parts can be mapped to different PRBs, respectively. At this time, the remaining part of each PRB, not mapped by the arbitrary DVRB, is mapped to a divided part of another DVRB. The LTE system has a system structure denoted by '$N_D$'='$N_d$'=2.

Semi-Persistent Scheduling (SPS) is a scheduling scheme for allocating resources to a specific UE such that the allocated resources can be persistently maintained during a specific time interval. In the case where a predetermined amount of data is transmitted during a specific time in the same manner as in a Voice over Internet Protocol (VoIP), control information need not be transmitted to each data transmission interval for resource allocation, such that an amount of wasted control information can be reduced by the SPS scheme.

'$N_{PRB}$' represents the number of PRBs in a system.

'$N_{LVRB}$' represents the number of LVRBs available in the system.

'$N_{DVRB}$' represents the number of DVRBs available in the system.

'$N_{LVRB\_UE}$' represents the maximum number of LVRBs allocable to one user equipment (UE).

'$N_{DVRB\_UE}$' represents the maximum number of DVRBs allocable to one UE.

'$N_{subset}$' represents the number of subsets.

'$N_{F-Block}$' represents the number of frequency bands used in a system capable of using a plurality of frequency bands.

Here, the "number of RBs" means the number of RBs classified on a frequency axis. That is, even in the case where RBs can be classified by slots constituting a subframe, the "number of RBs" means the number of RBs classified on the frequency axis of the same slot.

FIG. 12 shows an example of definitions of LVRBs and DVRBs.

As can be seen from FIG. 12, each RE of one LVRB is mapped one-to-one to each RE of one PRB. For example, one LVRB is mapped to a PRB0 (1201). In contrast, one DVRB is divided into three parts and the divided parts are mapped to different PRBs, respectively. For example, a DVRB0 is divided into three parts and the divided parts are mapped to a PRB1, PRB4 and PRB6, respectively. Likewise, a DVRB1 and a DVRB2 are each divided into three parts and the divided parts are mapped to the remaining resources of the PRB1, PRB4 and PRB6. Although each DVRB is divided into three parts in this example, the present invention is not limited thereto. For example, each DVRB may be divided into two parts.

Downlink data transmission from a base station (BS) to a specific terminal (i.e., a specific UE) or uplink data transmission from the specific UE to the base station (BS) is performed through one or more VRBs in one subframe. In other words, the above-mentioned data transmission may be achieved through PRBs corresponding to one or more VRBs. When the base station (BS) transmits data to the specific UE, it has to notify the terminal of which VRB will be used for data transmission. Also, in order to enable the specific UE to transmit data, the base station (BS) has to notify the terminal of which VRB will be used for data transmission. Specific information indicating how to map VRBs to PRBs can be predetermined, so that the UE can automatically recognize which PRB will be searched when acquiring information of VRBs allocated to the UE itself.

Data transmission schemes can be broadly classified into a frequency diversity scheduling (FDS) scheme and a frequency selective scheduling (FSS) scheme. The FDS scheme is a scheme that obtains a reception performance gain through frequency diversity, and the FSS scheme is a scheme that obtains a reception performance gain through frequency selective scheduling.

In the FDS scheme, a transmission stage transmits one data packet over subcarriers widely distributed in a system frequency domain so that symbols in the data packet can experience various radio channel fadings. Therefore, an improvement in reception performance is obtained by preventing the entire data packet from being subject to unfavorable fading. In contrast, in the FSS scheme, an improvement in reception performance is obtained by transmitting the data packet over one or more consecutive frequency areas in the system frequency domain which are in a favorable fading state. In a cellular OFDM wireless packet communication system, a plurality of terminals is present in one cell. At this time, because the radio channel conditions of the respective terminals have different characteristics, it is necessary to perform data transmission using the FDS scheme with respect to a certain UE and data transmission using the FSS scheme with respect to a different UE even within one subframe. As a result, a detailed FDS transmission scheme and a detailed FSS transmission scheme must be designed such that the two schemes can be efficiently multiplexed within one subframe. On the other hand, in the FSS scheme, a gain can be obtained by selectively using a band favorable to a UE among all available bands. In contrast, in the FDS scheme, a comparison is not made as to whether a specific band is good or bad, and, as long as a frequency interval capable of adequately obtaining diversity is maintained, there is no need to select and transmit a specific frequency band. Accordingly, it is advantageous in terms of improvement in overall system performance to perform the frequency selective scheduling of the FSS scheme preferentially when scheduling.

In the FSS scheme, because data is transmitted using subcarriers consecutively contiguous in the frequency domain, it is preferable that the data be transmitted using LVRBs. At this time, provided that $N_{PRB}$ PRBs are present in one subframe and a maximum of $N_{LVRB}$ LVRBs are available within the system, the base station can transmit bitmap information of $N_{LVRB}$ bits to each terminal to notify the terminal through which one of the LVRBs downlink data will be transmitted or through which one of the LVRBs uplink data can be transmitted. That is, each bit of the $N_{LVRB}$-bit bitmap information, which is transmitted to each terminal as scheduling information, indicates whether data will or can be transmitted through an LVRB corresponding to this bit, among the $N_{LVRB}$ LVRBs. This scheme is disadvantageous in that, when the number $N_{LVRB}$ becomes larger, the number of bits to be transmitted to each terminal becomes larger in proportion thereto.

In the meantime, physical downlink control channel (PD-CCH) downlink control information (DCI) transferred to a UE may have a plurality of formats. A resource allocation field transferred over the PDCCH may have different structures according to Downlink Control Information (DCI) formats. Thus, the user equipment (UE) may interpret the resource allocation field according to a format of the received DCI.

The resource allocation field may have two parts, i.e., resource block allocation information and a resource allocation header field. A plurality of resource allocation types may be defined. For example, according to a first resource allocation type, the resource block allocation information may have a bitmap indicating one set of consecutive physical resource blocks (PRBs). In this case, one bit may be allocated to one resource block group (RBG). According to a second resource allocation type, resource block allocation information may have a bitmap indicating subsets or RBs allocated to the UE. According to a third resource allocation type, resource block allocation information may have a bitmap indicating consecutively allocated VRBs. At this time, the resource allocation field may include a resource indication value (RIV) indicating a start resource block and the length of consecutively-allocated resource blocks (RBs). Examples of the above-mentioned resource allocation types have been disclosed in the 3GPP TS 36.213 document.

For example, a DCI format 1A prescribed in 3GPP TS 36.213 may be used for compact scheduling of one physical downlink shared channel (PDSCH) codeword. This compact scheduling is a scheduling scheme for allocating one set of consecutive VRBs to a UE, and corresponds to the above third resource allocation type. Hereinafter, the above-mentioned compact scheduling in the present invention may be referred to as a compact scheme.

As described above, provided that a terminal (i.e., the UE) may be assigned only one set of contiguous RBs, information of the assigned RBs may be represented by the compact scheme denoted by both a start point of RBs and the number of the RBs.

Figure 13:
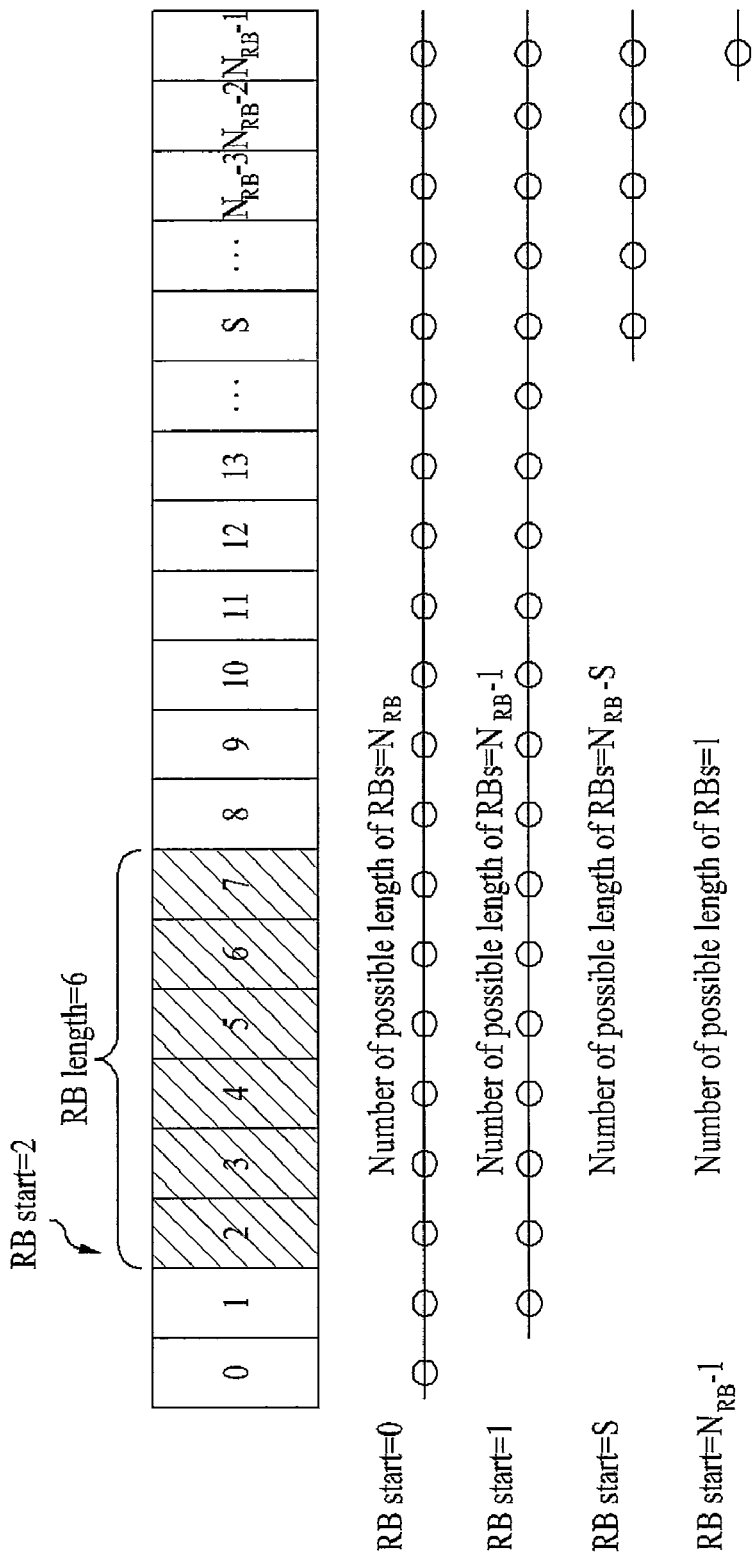
FIG. 13 is a view illustrating an example of a method for allocating resource blocks (RBs) by a compact scheme.

FIG. 13 is a view illustrating an example of a method for allocating resource blocks by a compact scheme. If the number of available RBs is denoted by $N_{RB}=N_{VRB}$, the length of available RBs varies depending on respective start points as shown in FIG. 13, such that the number of combinations for RB allocation is $N_{LVRB}(N_{LVRB}+1)/2$. Accordingly, the number of bits required for the combinations is 'ceiling(log 2($N_{LVRB}(N_{LVRB}+1)/2$))'. Here, ceiling(x) means rounding "x" up to the nearest integer. This method is advantageous over the bitmap scheme in that the number of bits does not significantly increase with the increase in the number $N_{LVRB}$.

On the other hand, for a method for notifying a UE of DVRB allocation, it is necessary to reserve the positions of respective divided parts of DVRBs distributively transmitted for a diversity gain. Alternatively, additional information may be required to directly notify the positions. Preferably, provided that the number of bits for signaling for the DVRBs is set to be equal to the number of bits in LVRB transmission of the above-stated compact scheme, it is possible to simplify a signaling bit format in a downlink. As a result, there are advantages that the same channel coding can be used, etc.

Here, in the case where one UE is allocated a plurality of DVRBs, this UE is notified of a DVRB index of a start point of the DVRBs, a length (=the number of the allocated DVRBs), and a relative position difference between divided parts of each DVRB (e.g., a gap between the divided parts). The LTE system is able to select either of 'Gap1' and 'Gap2', each of which has a predetermined value according to the number of system resource blocks. Accordingly, a value of 1 bit may be separately allocated to indicate the selection of 'Gap1' or 'Gap2'.

The following table 1 shows a structure of the 'Gap' which can be used in the LTE system according to a system bandwidth. In the case where the number of available system resource blocks (system RBs) is less than 50, only the 'Gap1' (=$1^{st}$ Gap) is used, so that there is no need to allocate one bit for 'Gap' indication. In contrast, in the case where the number of available system RBs is equal to or greater than 50, either one of 'Gap1' (=$1^{st}$ Gap) and 'Gap2' (=$2^{nd}$ Gap) must be used, so that signaling of 1 bit is needed to indicate which one of 'Gap1'(=$1^{st}$ Gap) and 'Gap2'(=$2^{nd}$ Gap) is used.

TABLE 1

| System BW ($N_{RB}^{DL}$) | Gap ($N_{gap}$) | |
|---|---|---|
| | $1^{st}$ Gap ($N_{gap,1}$) | $2^{nd}$ Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

Figure 14:
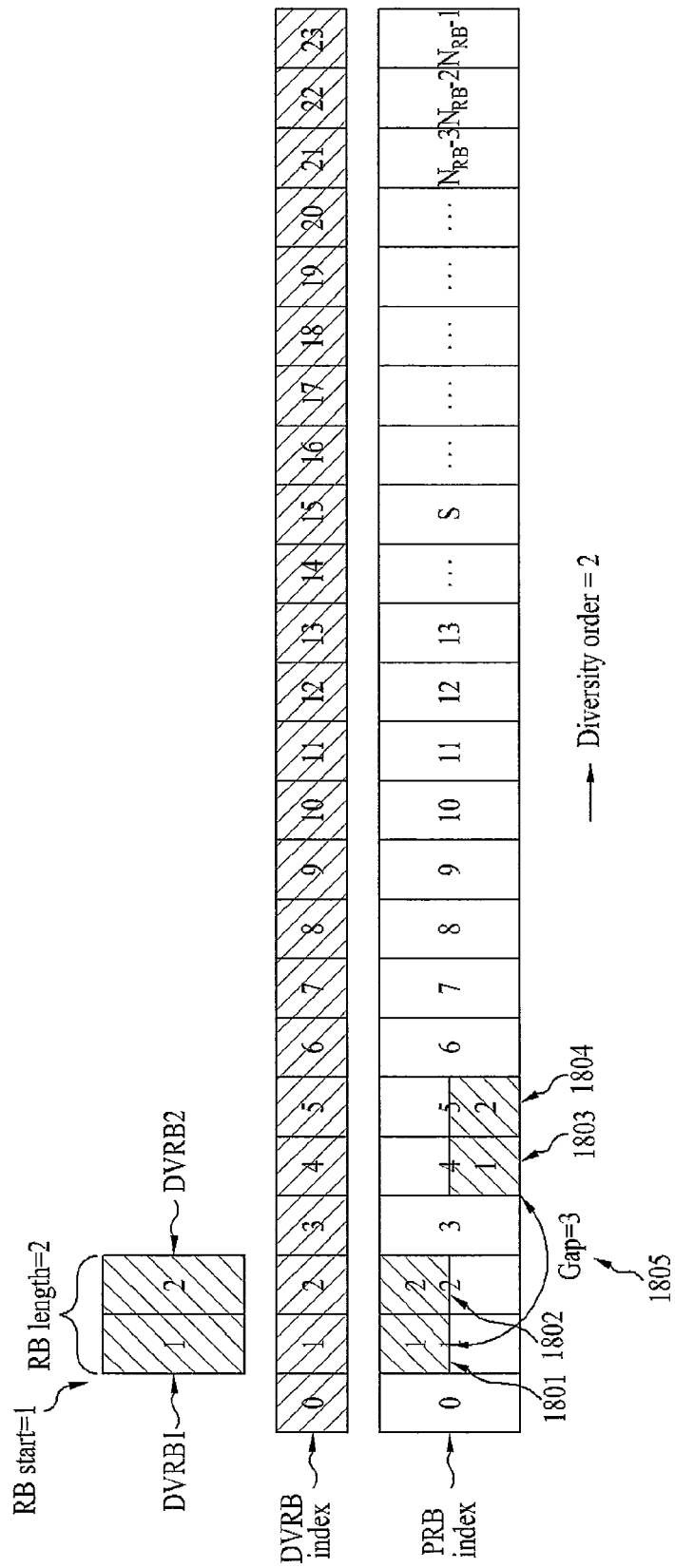
FIG. 14 is a view illustrating an example of a method for mapping two DVRBs having consecutive indexes to a plurality of contiguous PRBs.

FIG. 14 illustrates an example of a method for mapping two DVRBs having consecutive indexes to a plurality of contiguous PRBs.

As shown in FIG. 14, in the case where a plurality of DVRBs having consecutive indexes are mapped to a plurality of contiguous PRBs, first divided parts 1401 and 1402 and second divided parts 1403 and 1404 are spaced apart from each other by a gap 1405, while divided parts belonging to each of the upper divided parts and lower divided parts are contiguous to each other, so that the diversity order becomes 2. In this case, frequency diversity can be obtained only by a gap. In FIG. 14, $N_D=N_d=2$.

Figure 15:
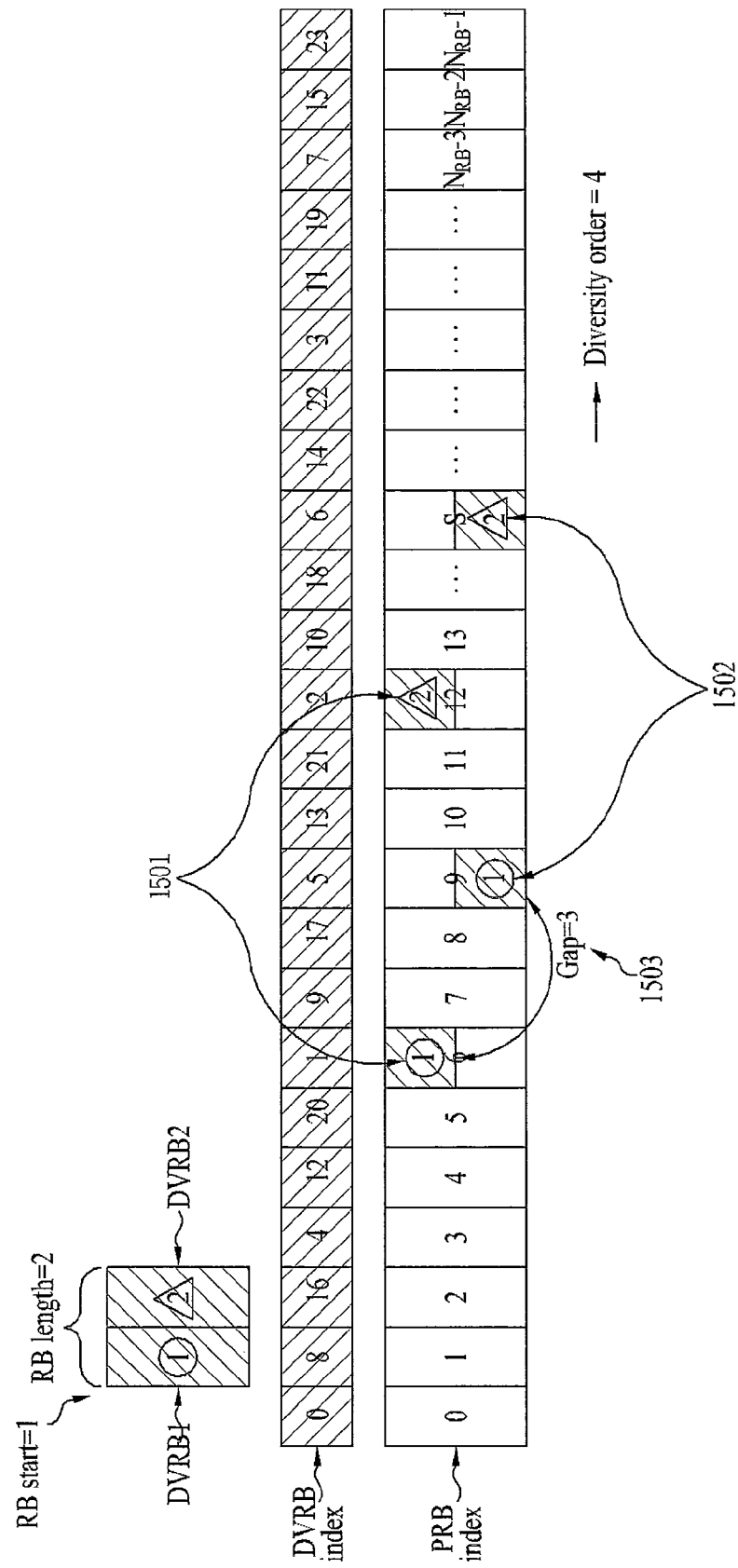
FIG. 15 is a view illustrating an example of a method for mapping two DVRBs having consecutive indexes to a plurality of spaced PRBs.

FIG. 15 illustrates an example of a method for mapping two DVRBs having consecutive indexes to a plurality of spaced PRBs.

In the method of FIG. 15, DVRB indexes are constructed as shown in FIG. 15. When mapping DVRBs to PRBs, consecutive DVRB indexes may be distributed without being mapped to contiguous PRBs. For example, a DVRB index '0' and a DVRB index '1' are not arranged contiguous to each other. In other words, in FIG. 15, DVRB indexes are arranged in the order of 0, 8, 16, 4, 12, 20, . . . , and this arrangement can be obtained by inputting the consecutive indexes to a block interleaver. In this case, it is possible to obtain distribution within each of the divided parts 1501 and 1502, as well as distribution by a gap 1503. Therefore, when a UE is allocated two DVRBs as shown in FIG. 15, the diversity order increases to 4, resulting in an advantage that an additional diversity gain can be obtained. In FIG. 15, $N_D=N_d=2$.

At this time, the value of the gap indicative of the relative position difference between the divided parts can be expressed in two ways. Firstly, the gap value can be expressed by a difference between DVRB indexes. Secondly, the gap value can be expressed by a difference between indexes of PRBs to which a DVRB is mapped. In the case of FIG. 15, Gap=1 in the first way, while Gap=3 in the second way. FIG. 15 shows the latter case 1503. Meanwhile, if the total number of RBs of the system is changed, the DVRB index arrangement may be changed accordingly. In this case, the use of the second way has the advantage of recognizing a physical distance between the divided parts.

In order to perform signaling of DVRB allocation, the above-mentioned LVRB compact scheme may be used. That is, if the compact scheme is applied to DVRBs signaled for one UE, PRBs mapped to the DVRBs may be distributed in a physical frequency domain, but these DVRBs have consecutive logical indexes in a virtual region (i.e., a logical region). In this case, a start point of consecutively-allocated RBs and length information of the RBs correspond to a start point of VRB indexes instead of PRB indexes and length information thereof, respectively.

As described above, in the compact scheme, LVRB signaling includes a start point of RBs and length information of the RBs. In order to perform the DVRB signaling, gap information may be additionally required in some cases. In order to constantly maintain the number of bits required for the entire signaling, there is a need to limit the length information such that an amount of information must be reduced. For example, when using 50 RBs or more, one bit of the RIV field must be assigned for 'Gap' indication, such that there is a need to reduce the number of bits required for transferring the RIV with the limitation in the length information.

On the other hand, in case of using RBs to perform the common signaling for several users, control signaling for notifying allocated RBs must allow all users present in a cell to read information of the allocated RBs. Thus, for this control signaling, a code rate may be reduced or a transmission power may be increased, such that the resultant control signaling information having a low code rate and a high transmission power may be transferred to several users. In order to reduce the code rate of the control signaling to which limited resources are allocated, an amount of control data must be reduced. In order to reduce the amount of control data, the number of bits required for RB allocation information must be reduced.

Likewise, control message data transferred to allocated RBs must allow all users present in the cell to read corresponding information, such that the control message data is transferred at a low code rate. Assuming that the code rate is ½₀, if an amount of data increases by 16 bits, an amount of codeword made after channel coding increases by 320 bits. In the Long Term Evolution (LTE), assuming that one TX antenna transmission (i.e., 1 Tx antenna transmission) is carried out and one OFDM symbol is used for a control signal, the number of symbols capable of transferring payload data within one RB (i.e., 1RB) is 148. Thus, assuming that a quadrature phase shift keying (QPSK) modulation is used, the number of transferable bits is 296. As a result, data increases by 16 bits, and data increases by 320 bits, such that two RBs are additionally needed.

That is, in order to maintain a low code rate, although the size of data increases slightly, the number of RBs required for transferring this data greatly increases, such that RBs need to be allocated with a granularity of one RB unit (i.e., a 1RB-based granularity).

Hereinafter, a resource allocation signaling structure for establishing a step for limiting a start position with a granularity of one-RB allocation (i.e., 1RB allocation) will be described in detail.

The following equation 1 shows an exemplary signaling method based on the compact scheme which notifies of a start point (S) of RBs and the number (=Length, L) of allocated RBs.

[Equation 1]

$$\begin{aligned}
&\text{if } L - 1 \leq \lfloor N_{RB}/2 \rfloor \text{ then} \\
&\quad RIV = N_{RB}(L - 1) + S \\
&\text{else} \\
&\quad RIV = N_{RB}(N_{RB} - L + 1) + (N_{RB} - 1 - S) \\
&\text{End} \\
&\text{Required bits} \\
&N_{bit\_required} = \lceil \log_2(RIV_{max} + 1) \rceil \\
&\text{Without limitation} \\
&\quad RIV_{max} = N_{RB} \cdot (N_{RB} + 1)/2 - 1 \\
&\text{With limitation } L^{Limit} \\
&\quad RIV_{max} = \min\{N_{RB} \cdot (N_{RB} + 1)/2 - 1, N_{RB} \cdot (L^{Limit} - 1) + N_{RB} - L^{Limit}\}
\end{aligned}$$

In the following description, "mod(x,y)" means "x mod y", and "mod" means a modulo operation. Also, "$\lfloor \cdot \rfloor$" means a descending operation, and represents a largest one of integers equal to or smaller than a numeral indicated in "$\lfloor \: \rfloor$". On the other hand, "$\lceil \cdot \rceil$" means an ascending operation, and represents a smallest one of integers equal to or larger than a numeral indicated in "$\lceil \: \rceil$". Also, "round(•)" represents an integer nearest to a numeral indicated in "( )". "min(x,y)" represents a smaller value selected between x and y, whereas "max(x,y)" represents a larger value selected between x and y.

Assuming that the total number of available RBs is denoted by $N_{RB}$ and the beginning number of indexes to be assigned to the RBs is set to 0, indexes from 0 to $N_{RB}-1$ are sequentially assigned to the RBs. In this case, $N_{RB}$ may be the total number of all RBs contained in a system band, the number of all RBs used as VRBs, or the number of RBs contained in any limited area.

Thus, the range of S may be $0 \leq S \leq N_{RB}-1$, and the range of allocable 'L' values is changed according to this S value. In another view, the L value is in the range of $1 \leq L \leq N_{RB}$, and the range of available S values is changed according to the L value. Namely, a certain S value is unable to be combined with a specific L value.

A maximum value of each of the S and L values may be represented by a binary number irrespective of such impossible combinations. A bit field for this binary number may be constructed for each of the S and L values. In case of transmitting each of the bit fields, if $N_{RB}$ is 20 (i.e., $N_{RB}$=20), 20 is less than $2^5$ (i.e., $20<2^5$), so that 5 bits for the S value and 5 bits for the L values, namely, a total of 10 bits, are needed. However, these 10 bits include information of useless combinations incapable of being actually generated, such that overhead of unnecessary transmission bits is generated. Thus, the number of transmission bits can be reduced if each combination of generable S and L values is represented by 'RIV', this RIV is converted into a binary number according to binary representation, and the resultant RIV of the binary number is then transferred.

FIG. 16 is a view illustrating an example of RIVs when $N_{RB}$=20.

As can be seen from FIG. 16, 'RIV' is decided according to S and L values. In case of calculating 'RIV' related to $0 \leq S \leq N_{RB}-1$ in each of all L values using Equation 1, RIVs of FIG. 16 are formed. The value of each element shown in FIG. 16 is 'RIV' indicating a combination of S and L values corresponding to the above element. Values contained in a left upper part covering almost half of FIG. 16 correspond to combinations of generable S and L values if $N_{RB}$=20, and values contained in a right lower part colored in gray, covering the other half of FIG. 16, correspond to combinations of S and L values incapable of being generated.

In this scheme, RIVs present in the gray-colored part under the condition of $L-1 \leq \lfloor N_{RB}/2 \rfloor$, are mapped to RIVs under the other condition of $L-1 > \lfloor N_{RB}/2 \rfloor$, such that no RIVs are wasted. For example, if $N_{RB}$ is set to 20 (i.e., $N_{RB}$=20), RIVs present in a specific part corresponding to $L < \lfloor N_{RB}/2 \rfloor + 1 = \lfloor 20/2 \rfloor + 1 = 11$ among the right lower part of FIG. 12 are reused in another part corresponding to $L > \lfloor N_{RB}/2 \rfloor + 1 = \lfloor 20/2 \rfloor + 1 = 11$ among the left upper part of FIG. 20. In this case, a maximum value (i.e., a maximum RIV) among RIVs present in the left upper end is 209.

In this scheme, the maximum RIV may influence the number of transmission bits, RIVs below the maximum RIV may not be mapped to values incapable of being obtained by combinations of actual S and L values. That is, all values below the maximum RIV correspond to combinations of generable S and L values.

In case of separately transmitting the S value, a maximum S value is 19, such that 5 bits are needed to indicate this S value '19' (where $0 \leq 19 < 2^5$). In case of separately transmitting the L value, a maximum L value is 20, such that 5 bits are needed to indicate this L value '20' (where $0 \leq 20 < 2^5$). Therefore, in case of transmitting the S and L values independent of each other, 10 bits are needed in the end. However, the RIVs are in the range of $0 \leq RIV \leq 209 < 2^8$, such that 8 bits are needed to indicate these RIVs, as denoted by $N_{bit\_required}$=8. As a result, it can be recognized that 2 bits are saved as compared to the above case of transmitting the S and L values independent of each other. In this case, a valid RIV is 209 and a maximum value capable of being indicated by 8 bits is 255, so that a total of 46 values of 210~255 are not actually used.

When using the conventional RIV table shown in FIG. 16, RIVs undefined in this RIV table become invalid for an LTE terminal. For example, RIVs from 210 to 255 in FIG. 16 become invalid for a conventional LTE terminal. Therefore, RIVs defined in the conventional RIV table are referred to as valid RIVs, and other RIVs undefined in this RIV table are referred to as invalid RIVs. For example, in FIG. 16, RIVs from 0 to 209 are valid RIVs, and RIVs from 210 to 255 are invalid RIVs.

Valid RIVs are able to indicate only allocation status information of RBs defined in the table of FIG. 16, and invalid RIVs are able to indicate allocation status information of other RBs undefined in the table of FIG. 16. In order to use invalid RIVs as described above, the assumption of the presence of invalid RIVs is needed. If the following equation 2 is satisfied, this means that RIVs that are not used as actual values while being capable of being transferred are always present.

$$N \neq M, \quad \text{[Equation 2]}$$

where, $N = \lceil \log_2(N_{RB}(N_{RB}+1)/2) \rceil$, $M = \log_2(N_{RB}(N_{RB}+1)/2)$ In Equation 2

$$\frac{N_{RB}(N_{RB}+1)}{2}$$

is a total number of valid RIVs when the number of resource blocks is $N_{RB}$. In Equation, N is a minimum length of a binary number for indicating all the valid RIVs. However, if $$\frac{N_{RB}(N_{RB}+1)}{2}$$

is not a multiple of 2, it is impossible for M to be an integer, so that M may be set to any non-integer value. In this case, in order to accomplish Equation 2, the following equation 3 must be achieved.

$$2^N \neq \frac{N_{RB}(N_{RB}+1)}{2} \quad \text{[Equation 3]}$$

Equation 3 can be represented by the following equation 4.

$$2^{N+1} \neq N_{RB}(N_{RB}+1) \quad \text{[Equation 4]}$$

In conclusion, if Equation 4 is accomplished, it can be seen that the aforementioned invalid RIVs exist.

Assuming that $2^{N+1} = N_{RB}(N_{RB}+1)$ is achieved, $(N_{RB}=2^a)$ and $(N_{RB}+1=2^b)$ must be established. That is, $2^a+1=2^b$ must be satisfied. In this case, in order to satisfy $2^a+1=2^b$, 'a' must be set to 0 (a=0) and 'b' must be set to 1 (b=1). Therefore, $2^{N+1} = N_{RB}(N_{RB}+1)$ is achieved only in the case of $N_{RB}$=1. However, because $6 \leq N_{RB} \leq 110$ is given in the LTE, $2^{N+1} \neq N_{RB}(N_{RB}+1)$ is achieved. Thus, in the LTE, $2^{N+1} = N_{RB}(N_{RB}+1)$ is not achieved. Therefore, $N = \lceil \log_2(N_{RB}^{UL}(N_{RB}^{UL}+1)/2) \rceil \neq M = \log_2(N_{RB}^{UL}(N_{RB}^{UL}+1)/2)$ is demonstrated, and the LTE always includes RIVs that are not used as actual values while being capable of being transmitted. Therefore, the above-mentioned proposed method can be used for the LTE at all times.

In the meantime, in the above-mentioned RIV construction method, if a maximum value (=$L^{limit}$) of allocable RBs is limited, i.e., if the L value is limited to $L^{limit}$ or less, the number of required bits may be reduced. In FIG. 12, if $L^{limit}$ is set to 6 (i.e., $L^{limit}$=6), the range of generable L values is given as $1 \leq L \leq 6$, combinations having other L values having the range of $7 \leq L \leq 20$ are not in use. At this time, it can be recognized that a maximum RIV among RIVs is 114. That is, the range of generable RIVs is given as $0 \leq RIV \leq 114 < 2^7$, so that the number of required bits is 7 as denoted by $N_{bit\_required\_lim}$=7. In this case, a valid maximum RIV is 114 and a maximum value capable of being denoted by 7 bits is 127, such that a total of 13 values from 115 to 127 are not actually used.

The SPS method among various scheduling methods used in the LTE system will hereinafter be described in detail.

Presently, in order to perform uplink SPS and/or downlink SPS, the LTE system firstly informs a UE of radio resource control (RRC) signaling information, such that the UE can recognize which subframe(s) will be used for SPS transmission/reception on the basis of the received RRC signaling information. In other words, time resources from among time-frequency resources allocated for SPS is firstly designated through RRC signaling. In order to indicate available subframes, for example, a period and offset of each subframe can be notified. However, because a UE is still assigned only the time resource domain through the RRC signaling, the UE cannot not transmit/receive data using the SPS. Therefore, the UE receives a PDCCH for indicating activation, and then allocates frequency resources according to RB allocation information included in the received PDCCH, and applies the modulation and the code rate depending on modulation and coding scheme (MCS) information, such that the UE starts transmitting/receiving data according to period and offset information of subframes allocated through the RRC signaling. Then, upon receiving a PDCCH for indicating deactivation from a base station (BS), the UE stops transmitting/receiving data. In the case where the UE receives a PDCCH indicating either the activation or the deactivation after stopping transmitting/receiving data, the UE restarts data transmission/reception using the period- and offset-information of each subframe allocated through the RRC signaling using the RB allocation and MCS information designated in the received PDCCH. In this case, the PDCCH including the activation-, deactivation-, and/or reactivation indication(s) may be a PDCCH from which an SPS cell radio network temporary identity (C-RNTI) is detected. In other words, while allocation of time resources is carried out through the RRC signaling, transmission/reception of actual signals can be carried out after a PDCCH indicating activation and reactivation of the SPS has been received. Interruption of signal transmission/reception occurs after the UE receives a PDCCH indicating SPS deactivation.

Presently, a variety of formats have been defined as PDCCH formats in the LTE system, for example, a format 0 for uplink, and formats 1, 1A, 1B, 1C, 1D, 2, 2A, 3, and 3A for downlink have been defined as PDCCH formats in the LTE system. Necessary control information may be selected from among a variety of control information according to usages of the above PDCCH formats, and a combination of the selected control information is formed, such that the necessary control information can be transmitted in the form of such a combination. For example, necessary control information may be selected from among hopping flag, RB allocation, MCS, Redundancy Version (RV), New Data Indicator (NDI), Transmission Power Control (TPC), a Cyclic Shift, Demodulation Reference Signal (DM RS), UL index, a Channel Quality Indicator (CQI) request, a DL allocation index, a Hybrid Automatic Repeat Request (HARQ) process number, a Transmitted Precoding Matrix Indicator (TPMI), and PMI confirmation.

SPS Activation and Reactivation

Basic information such as NDI, RB allocation, MCS information, and the like is needed for SPS activation or SPS reactivation. Each PDCCH format includes unnecessary information in addition to the basic information. In case of SPS deactivation, NDI, RB allocation, MCS information and the like are no longer required, and only the deactivation status information is required for the SPS deactivation.

SPS allocation and non-persistent allocation can be distinguished from each other according to whether a radio network temporary identity (RNTI) masked on a cyclic redundancy check (CRC) part of a PDCCH is an SPS C-RNTI or a C-RNTI. However, according to the present invention, when an SPS-based operation is performed, each of unnecessary bits among PDCCH formats is fixed to zero '0', such that this bit composed of '0' may be used to re-confirm SPS allocation information.

Detailed bit field structures of individual PDCCH formats during the SPS operation according to the present invention can be given as the following tables 2 to 5.

TABLE 2

| Format 0/1A indicator | 1 bit → '0' | Format 0 |
|---|---|---|
| Hopping Flag | 1 bit | |
| Resource Block Allocation | N bit | |
| MCS | 5 bits → '0xxxx' | First MSB '0': SPS Validation |
| NDI | 1 bit | |
| DM-RS | 3 bits → '000' | '000'→ SPS Validation |
| TPC (PUSCH) | 2 bits → '00' | '00'→ SPS Validation |
| CQI trigger | 1 bit | |
| UL index (TDD) | (2 bits) | |

Table 2 shows the 'format 0' for uplink, if it is assumed that all or some of the MCS, DM-RS, and TPC bit fields are set to zero '0' as shown in Table 2, the UE is able to confirm that the SPS C-RNTI is masked on the CRC part of a PDCCH, i.e., the UE is able to confirm SPS validation.

TABLE 3

| Format 0/1A indicator | 1 bit → '1' | Format 1A |
|---|---|---|
| LVRB/DVRB Flag | 1 bit | |
| Resource Block Allocation | N bit | |
| MCS | 5 bits → '0xxxx' | First MSB '0': SPS Validation |
| NDI | 1 bit | |
| HARQ index | 3 bits → '000' | 000'→ SPS Validation |
| TPC (PUCCH) | 2 bits | |
| RV | 2 bits → '00' | '00'→ SPS Validation |
| DL index (TDD) | (2 bits) | |

Table 3 shows the format LA for a Single Input Multi Output (SIMO) downlink compact scheme. As shown in Table 3, if it is assumed that all or some of the MCS, HARQ index, and RV bit fields are set to zero '0' as shown in Table 3, the UE is able to confirm that the SPS C-RNTI is masked on the CRC part of a PDCCH.

TABLE 4

| Allocation type Flag | 1 bit | |
|---|---|---|
| Resource Block Allocation | P bit | |
| MCS | 5 bits → '0xxxx' | First MSB '0': SPS Validation |
| HARQ index | 3 bits (4-bit TDD) → '000(0)' | '000(0)'→ SPS Validation |
| NDI | 1 bit | |
| RV | 2 bits → '00' | '00'→ SPS Validation |
| TPC (PUCCH) | 2 bits | |
| DL index (TDD) | 2 bits | |

Table 4 shows the format 1 for a Single Input Multi Output (SIMO) downlink scheme. As shown in Table 4, if it is assumed that all or some of the MCS, HARQ index, and RV bit fields are set to zero '0' as shown in Table 4, the UE is able to confirm that the SPS C-RNTI is masked on the CRC part of a PDCCH.

TABLE 5

| Allocation type Flag | 1 bit | |
|---|---|---|
| Resource Block Allocation | P bits | |
| TPC (PUCCH) | 2 bits | |
| DL index (TDD) | 2 bits | |
| HARQ index | 3 bits (4-bit TDD) → '000(0)' | '000(0)' → SPS Validation |
| HARQ swap flag | 1 bit | |
| MCS 1 | 5 bits → '0xxxx' | First MSB '0': SPS Validation |
| NDI 1 | 1 bit | |
| RV 1 | 2 bits → '00' | '00' → SPS Validation |
| MCS 2 | 5 bits → '0xxxx' | First MSB '0': SPS Validation |
| NDI 2 | 1 bit | |
| RV 2 | 2 bits → '00' | '00' → SPS Validation |
| Precoding | 3 or 6 bits | |

Table 5 shows the 'format 2/2A' for a closed-loop/open-loop Spatial Multiplexing (SM). As shown in Table 5, if it is assumed that all or some of the MCS, HARQ index, and RV bit fields are set to zero '0' as shown in Table 5, the UE is able to confirm that the SPS C-RNTI is masked on the CRC part of a PDCCH.

SPS Deactivation

The SPS deactivation method according to the present invention will hereinafter be described in detail.

The compact resource allocation method is used in the formats 0, 1A, 1B, 1C, and 1D among the above-mentioned PDCCH formats. In this case, when some of RIVs are valid RIVs and the other RIVs are invalid RIVs, the invalid RIVs may be used for an event requesting no RB allocation.

In the present invention, when a downlink control signal format based on the compact-type RB allocation scheme is used for signaling SPS activation and/or SPS deactivation, an RIV contained in the PDCCH from which the SPS C-RNTI is detected may be used as signaling information for SPS deactivation indication. In this case, the RIV contained in the PDCCH from which the SPS C-RNTI is detected may have any one of values capable of being used as the above-mentioned invalid RIVs.

For example, according to the RIV construction method shown in Table 1, a valid RIV indicating a generable RB allocation combination may be any one of RIVs from 0 to 209 (where this RIV '209' is a maximum valid RIV). In this case, an invalid RIV may be any one of RIVs from 210 to 255. If the RIV detected from the PDCCH from which the SPS C-RNTI is detected belongs to the invalid RIV, the UE recognizes that signaling information indicating SPS deactivation is transmitted. A maximum value capable of being indicated by a binary field indicating each RIV is certainly included in values capable of belonging to the invalid RIV. That is, the above-mentioned invalid RIV certainly includes a specific value acquired when the entire binary field indicating each RIV is filled with '1'. Specifically, in the case where the RIV detected in the PDCCH from which the SPS C-RNTI was detected is determined to be the above specific value acquired when the entirety of the binary field is filled with '1', it can be recognized that signaling information indicating SPS deactivation is transmitted on the basis of the above specific value.

Figure 17:
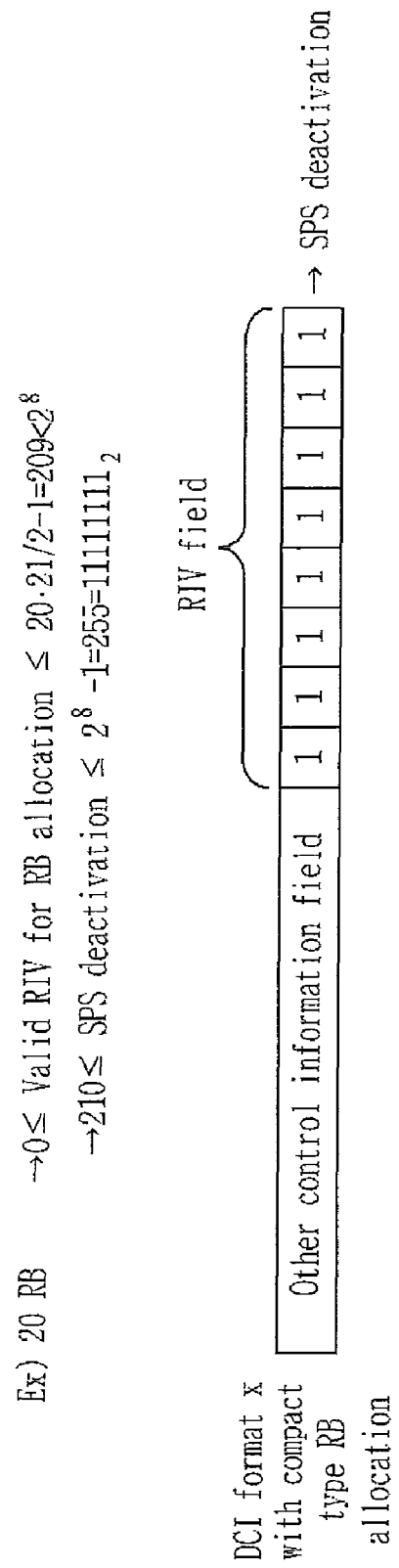
FIG. 17 shows an exemplary structure of a PDCCH field for signaling SPS deactivation according to the present invention.

FIG. 17 shows an exemplary structure of a PDCCH field for signaling SPS deactivation according to the present invention. As shown in FIG. 17, if the RIV binary field is composed of 8 bits, a binary number RIV (=11111111$_2$) is acquired. If the RIV (=11111111$_2$) is detected, this RIV (=11111111$_2$) may indicate that signaling information indicating SPS deactivation was transmitted.

A method for indicating SPS deactivation when DVRB allocation is carried out in a PDCCH having a DCI format 1A will hereinafter be described in detail.

Figure 18:
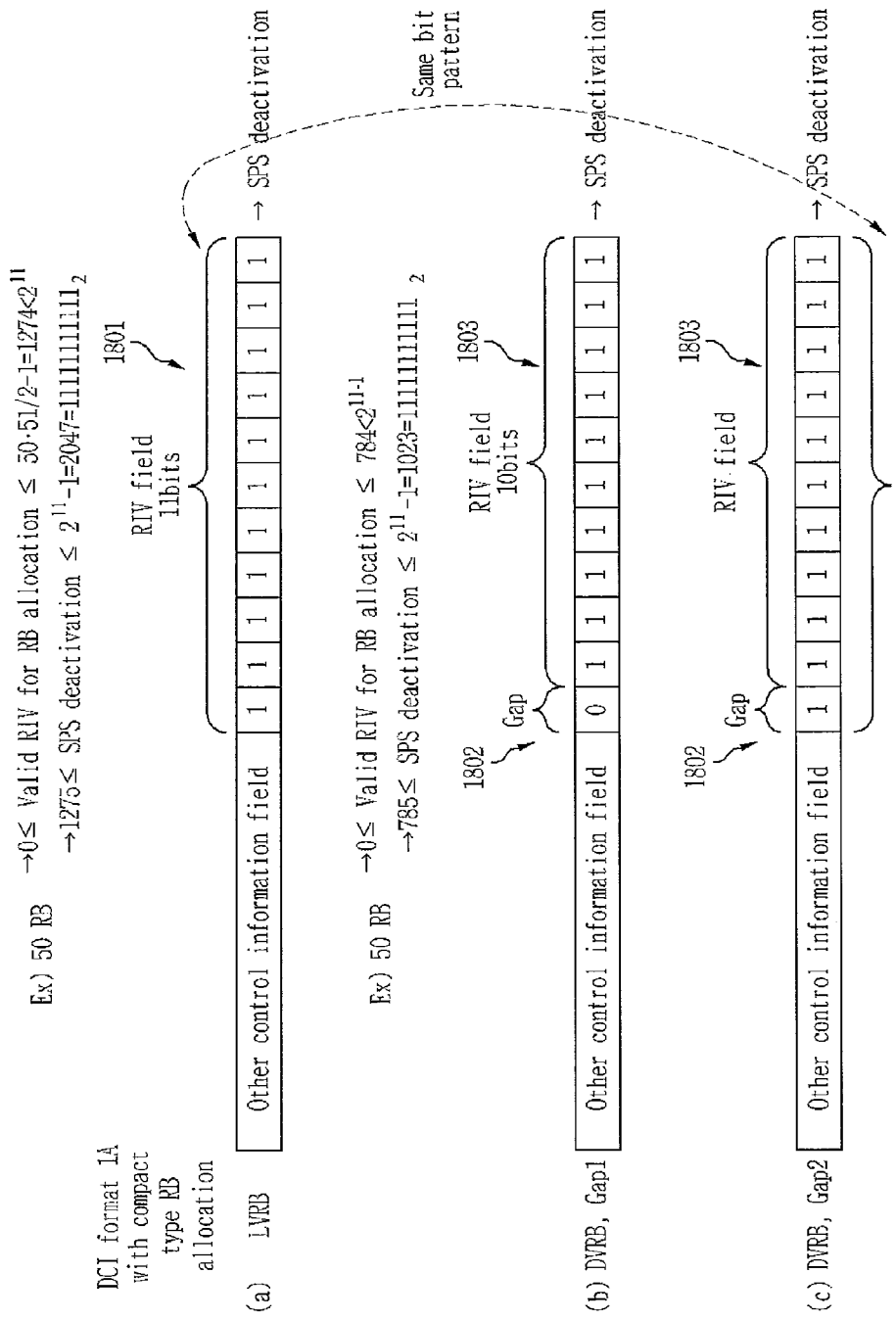
FIG. 18 shows individual fields acquired when DVRB allocation is carried out in a PDCCH having a 'DCI format 1A' according to the present invention.

FIG. 18 shows individual fields acquired when DVRB allocation is carried out in a PDCCH having a DCI format 1A according to the present invention. FIG. 18(a) shows an exemplary case in which an LVRB is used. FIGS. 18(b) and 18(c) illustrate exemplary cases, each of which shows the use of a DVRB. In more detail, FIG. 18(b) shows the use of 'Gap1' and FIG. 18(c) shows the use of 'Gap2'.

When using a DVRB as shown in FIGS. 18(b) and 18(c), one bit 1802 from among the entire bits 1801 used as an RIV field indicating LVRB allocation information as shown in FIG. 18(a) is used for indicating 'Gap1'/'Gap2'. Only the remaining bit field 1803 is allocated as an RIV field. In this case, as shown in FIG. 18, the maximum allocable number of RBs is limited to 16 so that the RIV does not exceed the maximum value which can be represented by the RIV field which is reduced by the one bit 1802.

At least one invalid RIV unused for allocating valid resources exists, and this invalid RIV may be used as signaling information indicating SPS deactivation. Specifically, if the invalid RIV exists, the maximum value capable of being indicated by the binary field indicating an RIV is included in the existing invalid RIV, so that this maximum value can be used for deactivation. In other words, the value acquired when the entirety of the RIV binary field is filled with '1' may be used for deactivation. As can be seen from FIG. 18, there may arise two cases according to indication 1802 of the 'Gap'. The SPS deactivation construction having 'Gap2' shown in FIG. 18(c) has the same bit pattern as that of FIG. 18(a) in which the RIV field for LVRB is configured to indicate the SPS deactivation.

In addition, in case of the SPS deactivation, a distinction between 'Gap1' and 'Gap2' and a distinction between LVRBs and DVRBs are meaningless. Therefore, even for a SPS UE which is using 'Gap1' shown in FIG. 18(b), the entire RIV field for LVRB can be filled out with '1' in order to represent SPS deactivation. In other words, although 'Gap1' is currently used as shown in FIG. 18(b), the 'Gap' indication field 1802 may be filled with '1' instead of '0' under the SPS deactivation.

Hereinafter, a method for indicating SPS deactivation when hopping is used for the PDCCH having the 'DCI format 0' according to the present invention will hereinafter be described.

Figure 19:
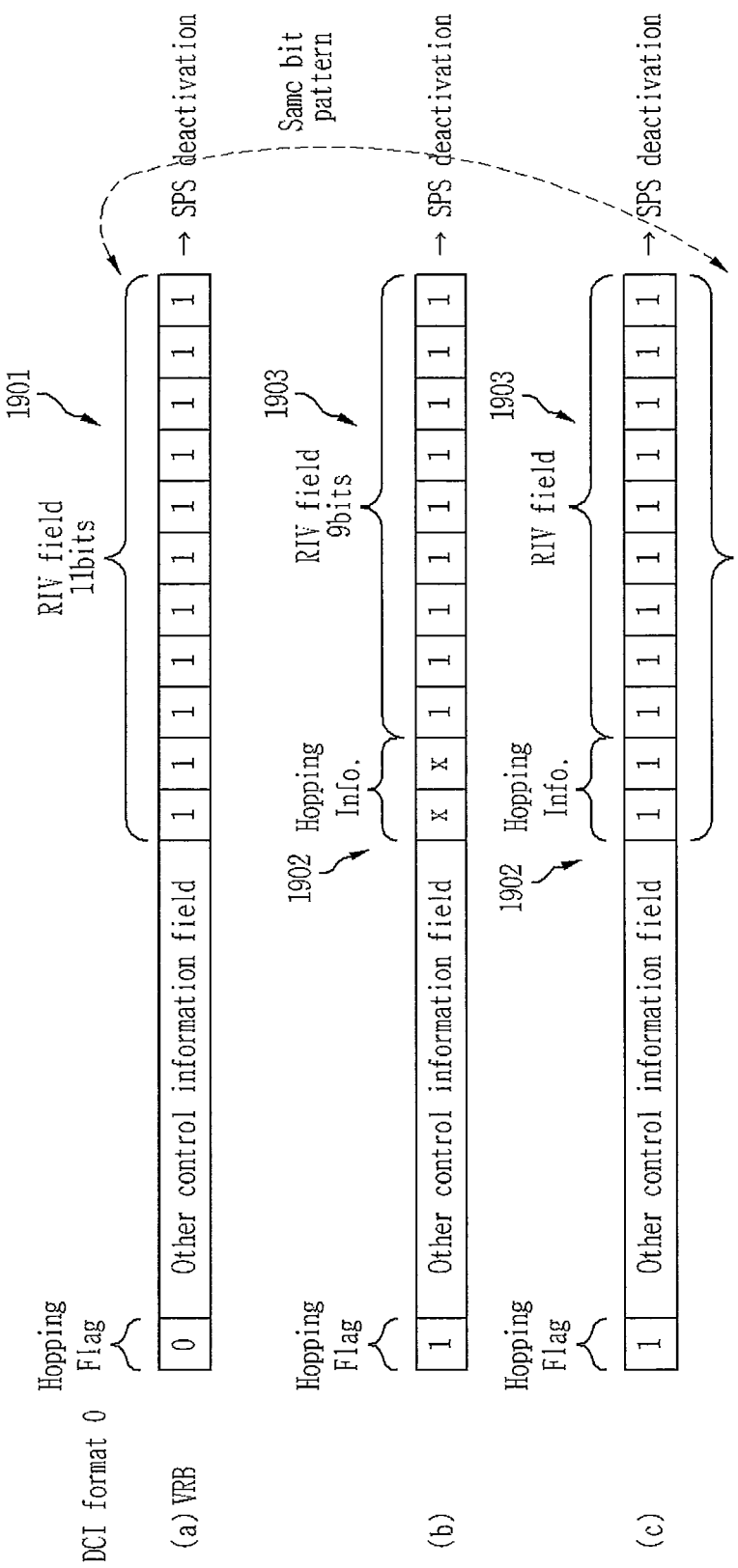
FIG. 19 shows individual fields of a PDCCH having a 'DCI format 0' according to the present invention.

FIG. 19 shows individual fields of a PDCCH having a 'DCI format 0' according to the present invention. FIG. 19(a) shows an exemplary case in which the hopping is not used. FIGS. 19(b) and 19(c) show other cases in which the hopping is used when a system band is in the range from 50 RBs to 110 RBs.

In the case where the system band is in the range from 50 RBs to 110 RBs as shown in FIGS. 19(b) and 19(c) and hopping is carried out, 2 bits 1902 from among all bits 1901 used as an RIV field indicating VRB allocation information are used to indicate hopping information. Only the remaining bits 1903 are allocated as an RIV field. If it is assumed that the hopping is carried out in the format 0 and the system bandwidth is in the range from 6 RBs to 49 RBs, one bit (1 bit) from among all bits used as the VRB RIV field is used to indicate the hopping information.

For example, as shown in FIGS. 19(b) and 19(c), the length of RBs capable of being maximally allocated is limited, such that an RIV does not exceed a maximum value capable of being indicated by the RIV field 1903. Even in the case, there exists at least one invalid RIV to be unused, and this invalid RIV may be used for SPS deactivation. The invalid RIV includes the maximum value capable of being indicated by a binary field through which the RIV will be transferred, such that this maximum value can be used for deactivation. There may arise two cases according to the hopping information as shown in FIG. 19. The SPS deactivation construction formed when each bit indicating the hopping information is set to '1' as shown in FIG. 19(c) has the same bit pattern as that of FIG. 19(a) in which the RIV field for VRB is configured to indicate the SPS deactivation.

In addition, as described above, the distinction based on hopping information is meaningless for the SPS deactivation. Therefore, even when a hopping is performed as like in FIG. 19(b) or 19(c), the entire RIV field 1901 can be filled with '1' to indicate SPS deactivation.

As described above, because it is enough to inform only the deactivation status without other control information to indicate a SPS deactivation, it is preferable that only one format be used for each of uplink and downlink. In other words, the format 0 may be used in uplink and the shortest format 1A may be used in downlink.

Tables 6 and 7 show examples of detailed field structures used when uplink SPS deactivation and downlink SPS deactivation are signaled by 'DCI format 0' and 'DCI format 1A', respectively.

TABLE 6

| Format 0/1A indicator | 1 bit → '0' | Format 0 |
| --- | --- | --- |
| Hopping Flag | 1 bit → 'x' | |
| Resource Block Allocation | N bit→ '11 ... 11' | SPS deactivation |
| MCS | 5 bits → '0xxxx' | First MSB '0': SPS Validation |
| NDI | 1 bit → 'x' | |
| DM-RS | 3 bits → '000' | '000'→ SPS Validation |
| TPC (PUSCH) | 2 bits → '00' | 00'→ SPS Validation |
| CQI trigger | 1 bit → 'x' | |
| UL index (TDD) | (2 bits) → 'xx' | |

Table 6 shows a PDCCH having a 'DCI format 0' for uplink. When a UE confirms that the SPS C-RNTI is masked on a CRC part of the PDCCH and that all or some of the MCS, DM-RS, and TPC bit fields are set to zero '0' as shown in Table 6, the UE is able to recognize that SPS is activated. In addition, a SPS deactivation can be signaled by setting the whole RIV field to '1' as described above. Because the bits in table 6, each of which is denoted by 'x', are irrelevant to SPS validation and SPS deactivation, an arbitrary value may be assigned to each of the bits. However, if all of the bits is fixed to '0' or '1', the UE may additionally confirm that the SPS is deactivated.

TABLE 7

| Format 0/1A indicator | 1 bit → '1' | Format 1A |
| --- | --- | --- |
| LVRB/DVRB Flag | 1 bit → 'x' | |
| Resource Block Allocation | N bit → '11 ... 11' | SPS deactivation |

TABLE 7-continued

| MCS | 5 bits → '0xxxx' | First MSB '0': SPS Validation |
| --- | --- | --- |
| NDI | 1 bit → 'x' | |
| HARQ index | 3 bits → '000' | '000'→ SPS Validation |
| TPC (PUCCH) | 2 bits → 'x' | |
| RV | 2 bits → '00' | '00'→ SPS Validation |
| DL index (TDD) | (2 bits) → 'xx' | |

Table 7 shows a PDCCH having a 'DCI format 1A' for downlink. When a UE confirms that the SPS C-RNTI is masked on a CRC part of the PDCCH and that all or some of the MCS, HARQ index, and RV bit fields are set to zero '0' as shown in Table 7, the UE is able to recognize that SPS is activated. In addition, the SPS deactivation can be signaled by setting the entire RIV field to '1' as described above. Because the bits in table 7, each of which is denoted by 'x', are irrelevant to either SPS validation or SPS deactivation, an arbitrary value may be assigned to each of the bits. However, if all of the bits is fixed to '0' or '1', the UE may additionally confirm that the SPS is deactivated.

Figure 20:
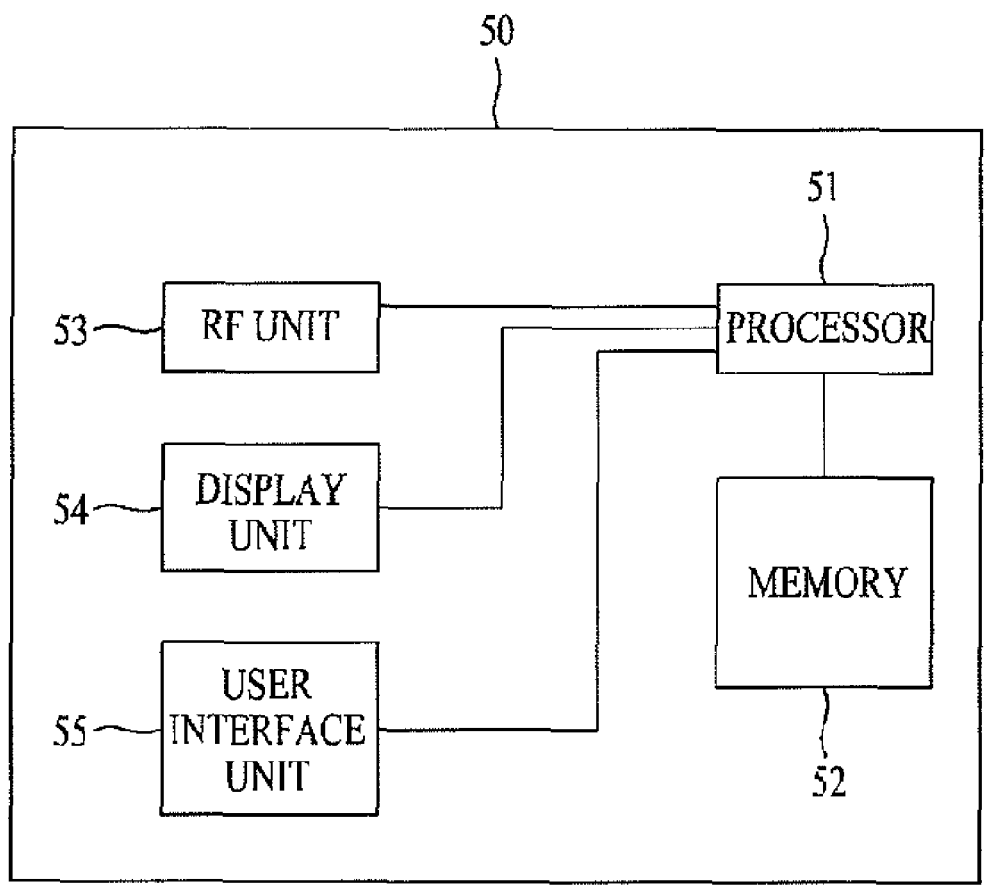
FIG. 20 is a block diagram illustrating constituent elements of a device applicable to the present invention.

FIG. 20 is a block diagram illustrating constituent elements of a device 50 applicable to the present invention.

In FIG. 20, the device 50 may be a UE or a base station (BS). In addition, the above-mentioned methods can be implemented by this device 50. The device 50 includes a processor 51, a memory 52, a Radio Frequency (RF) unit 53, a display unit 54, and a user interface unit 55. Layers of the radio interface protocol are realized in the processor 51. The processor 51 provides a control plane and a user plane. Functions of individual layers can be implemented in the processor 51. The processor 51 may include a contention resolution timer. The memory 52 is connected to the processor 51 and stores an operating system, applications, and general files. If the device 50 is a UE, the display unit 54 displays various information, and may use well-known elements such as a Liquid Crystal Display (LCD), an Organic Light Emitting Diode (OLED), and the like. The user interface unit 55 may be constructed of a combination of well-known user interfaces such as a keypad, a touch screen, and the like. The RF unit 53 is connected to the processor 51 so that it can transmit and receive RF signals to and from the processor 51.

EMBODIMENT 1

A method and apparatus for allowing the UE 50 shown in FIG. 20 to perform SPS deactivation according to a first embodiment of the present invention will hereinafter be described in detail.

The first embodiment of the present invention relates to a method and apparatus for deactivating semi-persistent scheduling (SPS) by the UE 50 of FIG. 20. The processor 51 contained in the UE 50 receives a downlink control channel from a base station (BS) through the RF unit 53. If the binary field indicating resource allocation information contained in the downlink control channel is entirely filled with '1', the processor 51 deactivates the SPS.

EMBODIMENT 2

A method and apparatus for allowing the base station (BS) 50 shown in FIG. 20 to transmit a signal for SPS deactivation according to a second embodiment of the present invention will hereinafter be described in detail.

The second embodiment of the present invention relates to a method and apparatus for transmitting a signal for SPS deactivation by the base station (BS) 50 shown in FIG. 20.

When performing the SPS deactivation, the processor 51 of the base station (BS) 50 fills the entire binary field indicating resource allocation information contained in a downlink control channel with the value of '1'. Thereafter, the processor 51 transmits the downlink control channel through the RF unit 53. In this case, the binary field filled with the value of '1' indicates SPS deactivation.

It is apparent to those skilled in the art that the first embodiment (Embodiment 1) and the second embodiment (Embodiment 2) can be reconstructed as a method invention embodied by a combination of steps executed in the RF unit and the processor.

EMBODIMENT 3

Figure 21:
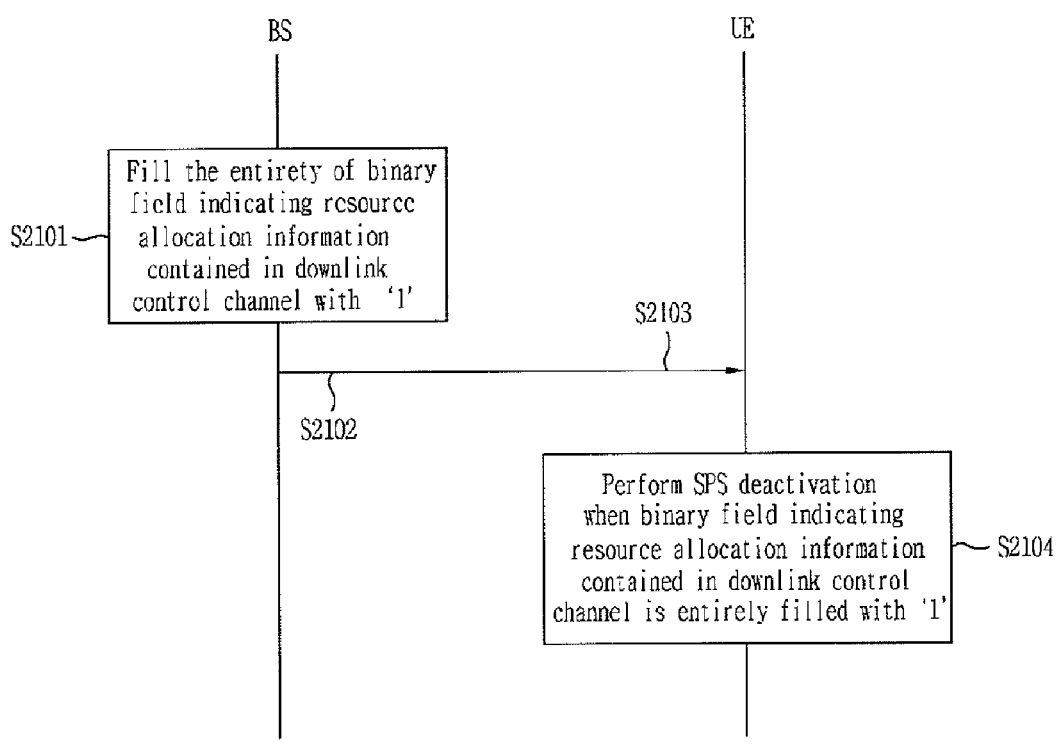
FIG. 21 is a flowchart illustrating a method for deactivating a semi-persistent scheduling (SPS) according to the present invention.

FIG. 21 is a flowchart illustrating a method for deactivating a semi-persistent scheduling (SPS) according to the present invention.

In order to perform SPS deactivation, a base station (BS) fills the entire binary field indicating resource allocation information contained in a downlink control channel with the value of '1' at step S2101. The base station (BS) transmits the downlink control channel to the UE at step S2102. The UE receives the downlink control channel from the base station (BS) at step S2103. When the entire binary field indicating resource allocation information contained in the downlink control channel is filled with '1', the UE performs the SPS deactivation.

The first to third embodiments (Embodiment 1~Embodiment 3) can be restricted as follows. The downlink control channel may be a PDCCH, and a Downlink Control Information (DCI) format of the downlink control channel may be a 'Format 0' or a 'Format 1A'. The wireless mobile communication system uses a scheduling method based on the compact scheme, and the binary field may be composed of a field indicating an RIV. Otherwise, the above-mentioned binary field may be composed of a field indicating an RIV and a field indicating 'Gap' information used for distributed allocation of resources. For another example, the above-mentioned binary field may be composed of a field indicating an RIV and a field indicating hopping information.

The present invention uses a Resource Indication Value (RIV) not mapped for RB allocation in a Physical Downlink Control Channel (PDCCH) so as to indicate an SPS deactivation status, so that it can inform a UE of SPS deactivation without adding a bit field or a new format.

Although the present invention has been disclosed by referring to the above-mentioned embodiments, it should be noted that the aforementioned embodiments have been disclosed only for illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents. Therefore, the present invention is not limited to the above-mentioned embodiments, but can be applied to other examples which can satisfy the above principles and new characteristics of the present invention.

As apparent from the above description, the present invention is applicable to a transmitter and a receiver for use in a communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for deactivating semi-persistent scheduling (SPS) in a wireless mobile communication system, the method comprising:

receiving, by a user equipment (UE), a downlink control channel signal related to a deactivation of the SPS; and deactivating, by the UE, the SPS after the downlink control channel signal is received, wherein the deactivation of the SPS includes a release of a downlink assignment or an uplink grant, wherein the downlink control channel signal comprises:

a first binary field related to resource allocation, the first binary field being entirely filled with '1', a second binary field related to a transmission power control (TPC), the second binary field being entirely filled with '0', and a third binary field related to a demodulation reference signal (DMRS), the third binary field being entirely filled with '0'.

2. The method according to claim 1, wherein the downlink control channel signal is a physical downlink control channel (PDCCH) signal.

3. The method according to claim 2, wherein a downlink control information (DCI) format of the downlink control channel signal is a 'format 0'.

4. The method according to claim 1, wherein the wireless mobile communication system uses a scheduling based on a compact scheme, and the first binary field is composed of a field indicating a resource indication value (RIV).

5. The method according to claim 1, wherein the wireless mobile communication system uses a scheduling based on a compact scheme, and the first binary field is composed of a field indicating a resource indication value (RIV) and a field indicating 'Gap' information used for distributed allocation of resources.

6. The method according to claim 1, wherein the wireless mobile communication system uses a scheduling based on a compact scheme, and the first binary field is composed of a field indicating a resource indication value (RIV) and a field indicating hopping information.

7. A method for transmitting a signal for semi-persistent scheduling (SPS) deactivation in a wireless mobile communication system, the method comprising:

filling, by a base station (BS), a first binary field related to resource allocation information contained in a downlink control channel signal entirely with '1';

filling, by the BS, a second binary field related to a transmission power control (TPC) and contained in the downlink control channel signal entirely with '0';

filling, by the BS, a third binary field related to a demodulation reference signal (DMRS) and contained in the downlink control channel signal entirely with '0'; and transmitting the downlink control channel signal to a user equipment (UE) for a deactivation of the SPS, wherein the deactivation of the SPS includes a release of a downlink assignment or an uplink grant.

8. The method according to claim 7, wherein the downlink control channel signal is a physical downlink control channel (PDCCH) signal.

9. The method according to claim 8, wherein a downlink control information (DCI) format of the downlink control channel signal is a 'format 0'.

10. The method according to claim 7, wherein the wireless mobile communication system uses a scheduling based on a compact scheme, and the first binary field is composed of a field indicating a resource indication value (RIV).

11. The method according to claim 7, wherein the wireless mobile communication system uses a scheduling based on a compact scheme, and the first binary field is composed of a field indicating a resource indication value (RIV) and a field indicating 'Gap' information used for distributed allocation of resources.

12. The method according to claim 7, wherein the wireless mobile communication system uses a scheduling based on a compact scheme, and the first binary field is composed of a field indicating a resource indication value (RIV) and a field indicating hopping information.

13. A user equipment (UE) for a wireless mobile communication system, the UE comprising:
a radio frequency (RF) unit; and
a processor electrically connected to the RF unit,
wherein the processor is configured to receive a downlink control channel signal related to a deactivation of a semi-persistent scheduling (SPS) through the RF unit, and to deactivate the SPS after the downlink control channel signal is received,
wherein the deactivation of the SPS includes a release of a downlink assignment or an uplink grant,
wherein the downlink control channel signal comprises:
a first binary field related to resource allocation, the first binary field being entirely filled with '1',
a second binary field related to a transmission power control (TPC), the second binary field being entirely filled with '0', and
a third binary field related to demodulation reference signal (DM RS), the third binary field being entirely filled with '0'.

14. The UE according to claim 13, wherein the downlink control channel signal is a physical downlink control channel (PDCCH) signal.

15. The UE according to claim 14, wherein a downlink control information (DCI) format of the downlink control channel signal is a 'format 0'.

16. The UE according to claim 13, wherein the wireless mobile communication system uses a scheduling based on a compact scheme, and the first binary field is composed of a field indicating a resource indication value (RIV).

17. The UE according to claim 13, wherein the wireless mobile communication system uses a scheduling based on a compact scheme, and the first binary field is composed of a field indicating a resource indication value (RIV) and a field indicating 'Gap' information used for distributed allocation of resources.

18. The UE according to claim 13, wherein the wireless mobile communication system uses a scheduling based on a compact scheme, and the first binary field is composed of a field indicating a resource indication value (RIV) and a field indicating hopping information.

19. A wireless communication apparatus comprising:
a radio frequency (RF) unit; and
a processor electrically connected to the RF unit,
wherein the processor is configured to
fill a first binary field resource allocation contained in a downlink control channel signal entirely with '1',
fill a second binary field related to a transmission power control (TPC) contained in the downlink control channel signal entirely with '0',
fill a third binary field related to a demodulation reference signal (DMRS) contained in the downlink control channel signal entirely with '0', and
transmit the downlink control channel signal to a user equipment (UE) for deactivation of a semi-persistent scheduling (SPS),
wherein the deactivation of the SPS includes a release of a downlink assignment or an uplink grant.

20. The wireless communication apparatus according to claim 19, wherein the downlink control channel signal is a physical downlink control channel (PDCCH) signal.

21. The wireless communication apparatus according to claim 20, wherein a downlink control information (DCI) format of the downlink control channel signal is a 'format 0'.

22. The wireless communication apparatus according to claim 19, wherein a scheduling based on a compact scheme is used, and the first binary field is composed of a field indicating a resource indication value (RIV).

23. The wireless communication apparatus according to claim 19, wherein a scheduling based on a compact scheme is used, and the first binary field is composed of a field indicating a resource indication value (RIV) and a field indicating 'Gap' information used for distributed allocation of resources.

24. The wireless communication apparatus according to claim 19, wherein a scheduling based on a compact scheme is used, and the first binary field is composed of a field indicating a resource indication value (RIV) and a field indicating hopping information.

* * * * *